United States Patent
Hermanns et al.

(10) Patent No.: US 9,870,203 B2
(45) Date of Patent: Jan. 16, 2018

(54) CONSUMPTION LAYER FOR BUSINESS ENTITIES

(71) Applicants: Marcel Hermanns, Heidelberg (DE); Cristina Buchholz, Reilingen (DE); Ivo Vollrath, Waghäusel (DE); Klaus Rehberger, Eppelheim (DE); Michael Brombach, Leimen (DE); Oswald Gschnitzer, Heidelberg (DE); Faiz Mohamed Ibrahim, Heidelberg (DE)

(72) Inventors: Marcel Hermanns, Heidelberg (DE); Cristina Buchholz, Reilingen (DE); Ivo Vollrath, Waghäusel (DE); Klaus Rehberger, Eppelheim (DE); Michael Brombach, Leimen (DE); Oswald Gschnitzer, Heidelberg (DE); Faiz Mohamed Ibrahim, Heidelberg (DE)

(73) Assignee: SAP SE, Walldorf (DE)

( * ) Notice: Subject to any disclaimer, the term of this patent is extended or adjusted under 35 U.S.C. 154(b) by 837 days.

(21) Appl. No.: 14/303,564

(22) Filed: Jun. 12, 2014

(65) Prior Publication Data

US 2015/0160814 A1    Jun. 11, 2015

Related U.S. Application Data

(60) Provisional application No. 61/912,290, filed on Dec. 5, 2013, provisional application No. 61/912,254, filed
(Continued)

(51) Int. Cl.
*G06F 3/0481*    (2013.01)
*G06F 3/0482*    (2013.01)
(Continued)

(52) U.S. Cl.
CPC .......... *G06F 8/20* (2013.01); *G06F 8/22* (2013.01); *G06F 17/30294* (2013.01);
(Continued)

(58) Field of Classification Search
CPC ..... G06F 3/0481; G06F 3/0482; G06F 9/4443
See application file for complete search history.

(56) References Cited

U.S. PATENT DOCUMENTS 5,550,971 A     8/1996  Brunner et al.
7,415,484 B1 *  8/2008  Tulkoff .............. G06F 8/24
(Continued)

OTHER PUBLICATIONS

Response to Non-Final Office Action for U.S. Appl. No. 14/303,563, filed Dec. 4, 2015, 8 pages.
(Continued)

*Primary Examiner* — Mahelet Shiberou
(74) *Attorney, Agent, or Firm* — Brake Hughes Bellermann LLP

(57) ABSTRACT

A system includes a first non-transitory computer-readable storage medium and a second non-transitory computer-readable storage medium each having stored thereon computer executable program code which, when executed on a computer system, causes the computer system to perform steps. The steps associated with the first non-transitory computer readable medium include generating a Service Adaptation Definition Language (SADL) definition for each of a plurality of business entity types, the SADL definition being based on an intermediate representation of each of the plurality of business entities, and publishing the SADL definition as a service of a SADL engine. The steps associated with the second non-transitory computer-readable storage include discovering the SADL definition and displaying, on a user interface, a representation of the SADL definition, the user interface configured to enable selection of two or
(Continued)

more business entity types each associated with a different model layer framework.

20 Claims, 16 Drawing Sheets

Related U.S. Application Data on Dec. 5, 2013, provisional application No. 61/912,287, filed on Dec. 5, 2013.

(51) Int. Cl.
    *G06F 9/44* (2006.01)
    *G06F 17/30* (2006.01)
    *G06F 9/45* (2006.01)

(52) U.S. Cl.
    CPC .......... *G06F 17/30604* (2013.01); *G06F 8/24* (2013.01); *G06F 8/40* (2013.01)

(56) References Cited

U.S. PATENT DOCUMENTS

| | | | |
|---|---|---|---|
| 7,734,619 B2 * | 6/2010 | Vierich | G06F 17/30592 707/718 |
| 8,387,030 B2 | 2/2013 | Brunswig et al. | |
| 8,412,549 B2 | 4/2013 | Graeber et al. | |
| 8,577,991 B2 | 11/2013 | Rehmann et al. | |
| 9,069,645 B2 | 6/2015 | Kemmler | |
| 9,223,549 B1 * | 12/2015 | Hermanns | G06F 8/34 |
| 9,280,788 B2 * | 3/2016 | Ferrari | |
| 9,336,023 B2 | 5/2016 | Collins et al. | |
| 2002/0111995 A1 | 8/2002 | Mansour et al. | |
| 2003/0004809 A1 | 1/2003 | Palcic et al. | |
| 2003/0074352 A1 | 4/2003 | Raboczi et al. | |
| 2004/0103100 A1 | 5/2004 | Levine | |
| 2004/0148586 A1 | 7/2004 | Gilboa | |
| 2004/0181471 A1 | 9/2004 | Rogers et al. | |
| 2004/0187140 A1 | 9/2004 | Aigner et al. | |
| 2004/0250238 A1 | 12/2004 | Singh et al. | |
| 2005/0120051 A1 | 6/2005 | Danner et al. | |
| 2005/0172261 A1 * | 8/2005 | Yuknewicz | G06F 8/38 717/106 |
| 2005/0177601 A1 | 8/2005 | Chopra et al. | |
| 2006/0074967 A1 | 4/2006 | Shaburov et al. | |
| 2008/0163253 A1 | 7/2008 | Massmann et al. | |
| 2008/0313595 A1 | 12/2008 | Boulineau et al. | |
| 2010/0049734 A1 * | 2/2010 | Wintel | G06Q 10/06 707/E17.055 |
| 2010/0058113 A1 | 3/2010 | Rapp et al. | |
| 2010/0107136 A1 | 4/2010 | Fildebrandt et al. | |
| 2010/0251129 A1 | 9/2010 | Beringer et al. | |
| 2011/0161940 A1 | 6/2011 | Brunswig et al. | |
| 2011/0161942 A1 | 6/2011 | Brunswig et al. | |
| 2011/0219154 A1 | 9/2011 | Bykov et al. | |
| 2011/0282704 A1 | 11/2011 | Graeber et al. | |
| 2012/0054262 A1 * | 3/2012 | Demant | G06F 9/54 709/203 |
| 2012/0089534 A1 | 4/2012 | Liebig et al. | |
| 2012/0102451 A1 | 4/2012 | Kulkarni et al. | |
| 2012/0110468 A1 | 5/2012 | Ackermann et al. | |
| 2012/0117121 A1 * | 5/2012 | Thomas | G06F 17/30557 707/796 |
| 2012/0137271 A1 | 5/2012 | Kemmler | |
| 2012/0158797 A1 | 6/2012 | Hermanns et al. | |
| 2012/0198416 A1 | 8/2012 | Sirr et al. | |
| 2012/0324421 A1 * | 12/2012 | Boeckenhauer | G06F 8/30 717/108 |
| 2013/0013649 A1 | 1/2013 | El Husseini et al. | |
| 2013/0031565 A1 | 1/2013 | Wachter et al. | |
| 2013/0124611 A1 | 5/2013 | Thormaehlen et al. | |
| 2013/0159037 A1 | 6/2013 | Keil et al. | |
| 2013/0159909 A1 * | 6/2013 | Kornmann | G06Q 10/00 715/771 |
| 2013/0179229 A1 | 7/2013 | Graeber et al. | |
| 2013/0326464 A1 | 12/2013 | Hermanns et al. | |
| 2014/0181005 A1 | 6/2014 | Baumgaertel et al. | |
| 2014/0181788 A1 * | 6/2014 | Sullivan | G06F 8/38 717/109 |
| 2014/0330745 A1 | 11/2014 | Hampapur et al. | |
| 2015/0074136 A1 | 3/2015 | Hutzel et al. | |
| 2015/0081658 A1 | 3/2015 | Meyles et al. | |
| 2015/0160928 A1 | 6/2015 | Hermanns | |
| 2015/0161180 A1 | 6/2015 | Hermanns et al. | |

OTHER PUBLICATIONS

Final Office Action received for U.S. Appl. No. 14/303,563, dated Mar. 7, 2016, 22 pages.
Non-Final Office Action for U.S. Appl. No. 14/303,563 dated Aug. 14, 2015, 18 pages.
Non Final Office Action for U.S. Appl. No. 14/303,563, dated Oct. 13, 2016, 24 pages.
Non Final Office Action for U.S. Appl. No. 14/303,565, dated Sep. 2, 2016, 17 pages.
Response to Final Office Action for U.S. Appl. No. 14/303,563, filed Aug. 3, 2016, 8 pages.
Response to Non Final Office Action for U.S. Appl. No. 14/303,565, filed Dec. 1, 2016, 11 pages.
Final Office Action for U.S. Appl. No. 14/303,563, dated Jul. 12, 2017, 26 pages.
Final Office Action for U.S. Appl. No. 14/303,565, dated Feb. 22, 2017, 23 pages.
Non Final Office Action for U.S. Appl. No. 14/303,565, dated Jun. 1, 2017, 23 pages.
Response to Non Final Office Action for U.S. Appl. No. 14/303,563, filed Apr. 10, 2017, 8 pages.
Final Office Action for U.S. Appl. No. 14/303,565, dated Oct. 19, 2017, 27 pages.
Notice of Allowance for U.S. Appl. No. 14/303,563, dated Sep. 8, 2017, 15 pages.
Response to Final Office Action for U.S. Appl. No. 14/303,563, filed on Aug. 16, 2017, 11 pages.
Response to Non Final Office Action for U.S. Appl. No. 14/303,565, filed on Aug. 31, 2017, 11 pages.
Dalmasso, Isabelle, et al., "Survey, Comparison and Evaluation of Cross Platform Mobile Application Development Tools", International Wireless Communications and Mobile Computing Conference, 2013, pp. 323-328.
Gavalas, Damianos, et al., "Development Platforms for Mobile Applications: Status and Trends", IEEE Software, vol. 28, Issue 1, 2011, pp. 77-86.
Muller, Thomas, et al., "Virtualization Techniques for Cross Platform Automated Software Builds, Tests and Deployment", Fourth International Conference on Software Engineering Advances, 2009, pp. 73-77.
Savolainen, Juha, et al., "Developing Platforms for Multiple Software Product Lines", Proceedings of International Software Product Line Conference, vol. 1, Sep. 2-7, 2012, pp. 220-228.
Smutny, Pavel, "Mobile Development tools and Cross-Platform Solutions", International Carpathian Control Conference, 2012, pp. 653-656.
Wasserman, Anthony I., "Software Engineering Issues for Mobile Application Development", Proceedings of the FSE/SDP Workshop on Future of Software Engineering Research, 2010, pp. 397-400.

* cited by examiner

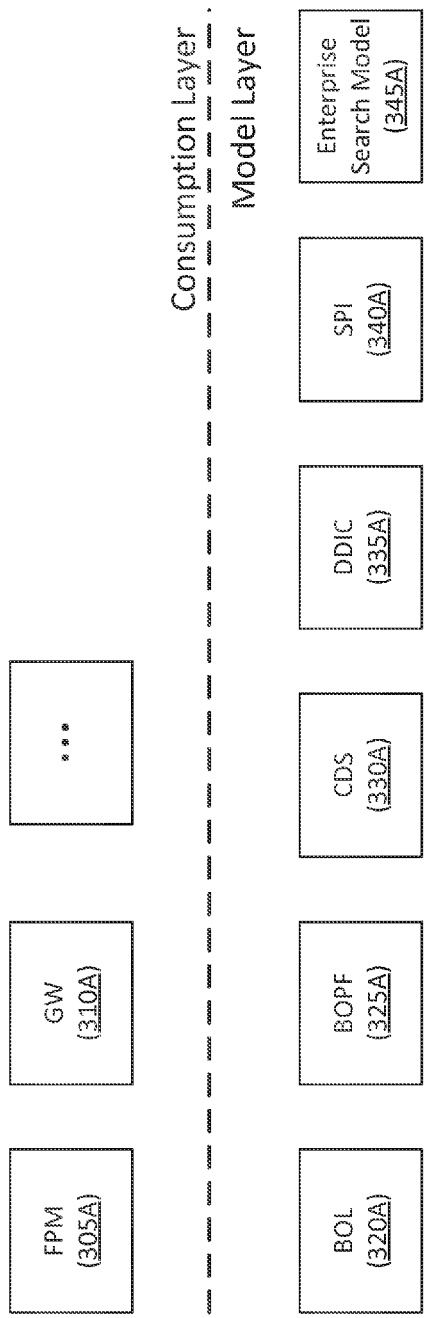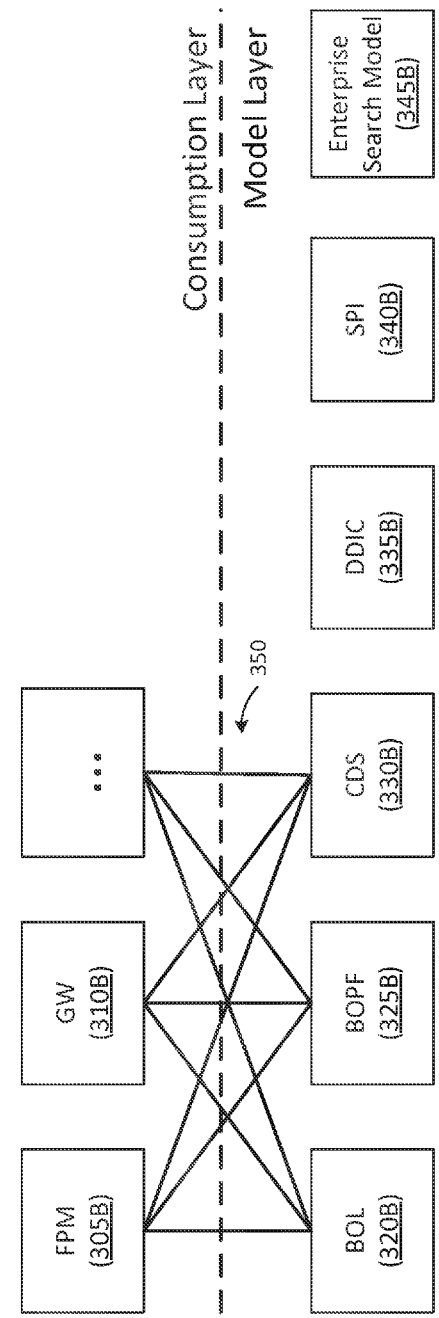

CONSUMPTION LAYER FOR BUSINESS ENTITIES

This application claims the benefit of U.S. Provisional Patent Application 61/912,290 filed on Dec. 5, 2013 entitled "ADVANCED BUSINESS APPLICATION PROGRAMMING (ABAP) QUERY INTERFACE", U.S. Provisional Patent Application 61/912,254 filed on Dec. 5, 2013 entitled "SERVICE ADAPTION LANGUAGE (SADL) ENTITY" and U.S. Provisional Patent Application 61/912,287 filed on Dec. 5, 2013 entitled "SERVICE ADAPTION LANGUAGE (SADL) AS A TIMELESS CONSUMPTION LAYER", the entire contents each of which are incorporated herein by reference. This application is related to co-pending application Ser. No. 13/303,563 entitled "BUSINESS OBJECT MODEL LAYER INTERFACE", and co-pending application Ser. No. 14/303,565 entitled "CONSUMPTION LAYER QUERY INTERFACE", the entire contents each of which are incorporated herein by reference.

FIELD

Embodiments relate to computing, and in particular, to systems and methods for consumption layer utilization (e.g., user interface (UI) development) of decoupled consumption and business model layers.

BACKGROUND

Databases and business objects and/or entities are highly useful tools allowing users to manage complex relationships between large amounts of different types of data. When data is requested to be read, analyzed, and returned in a de-normalized view from a database, in general a user interface (UI), web service, data export and the like will formulate a use scenario, such as a query, search, or free search having features, to the database. The database can include a large number of instantiated business objects, entities that include attributes and associations with other business objects.

Typically, different data models and business object frameworks are implemented in a complex architecture. For example, an integration of each business model into different user interface (UI) technologies can include complex integrations with differing frameworks. Therefore, systems implemented using the UI technologies and the different business models result in different components and the point-to-point integrations. The point-to-point integrations can result in a high total cost of development (TCD) for the business object framework development, maintenance, and the integration effort for the system. Experiences for application developers can be less than ideal, because each of the different integrations have no harmonized look and feel. Again this can results in a high TCD for the developer as well as any partners and/or customers, because no common concepts, tooling and integrations are in place in the current art. As a result, a developer has to learn point to point integration. In addition, a combination of different integrations may not be possible or may require a significant amount of manual effort.

SUMMARY

One embodiment includes a non-transitory computer-readable storage medium having stored thereon computer executable program code which, when executed on a computer system, causes the computer system to perform steps. The steps include discovering a Service Adaptation Definition Language (SADL) definition, the SADL definition representing a plurality of business entity types each associated with a model layer framework and each of the plurality of business entity types including at least one business entity, displaying a representation of the SADL definition, receiving an indication of a first selection of a first business entity type of the plurality of business entity types, and receiving an indication of a second selection of a second business entity type of the plurality of business entity types, the second business entity type being associated with a different model layer framework than the first business entity type.

Implementations can include one or more of the following features. For example, the steps may further include receiving an indication of a selection of a business entity associated with one of the first business entity type and the second business entity type, receiving an indication of a selection of business object service associated with the business entity, and mapping the selected business object service to the business entity. The steps may further include receiving an indication of a selection of a business entity associated with one of the first business entity type and the second business entity type, receiving an indication of a selection of an item associated with the business entity, and mapping the selected item to the business entity.

For example, the steps may further include creating a property having a property name, choosing an ABAP field to link to the property, and binding the property to an item selected from a SADL entity. When the user interface is being operated by an end user, the steps further comprise triggering at least one of query, create, read, update and delete operations associated with the business entity. The SADL definition may be programming language independent of a model layer framework.

Another embodiment includes a system. The system includes a first non-transitory computer-readable storage medium and a second non-transitory computer-readable storage medium each having stored thereon computer executable program code which, when executed on a computer system, causes the computer system to perform steps. The steps associated with the first non-transitory computer readable medium include generating a Service Adaptation Definition Language (SADL) definition for each of a plurality of business entity types, the SADL definition being based on an intermediate representation of each of the plurality of business entities, and publishing the SADL definition as a service of a SADL engine. The steps associated with the second non-transitory computer-readable storage include discovering the SADL definition and displaying, on a user interface, a representation of the SADL definition, the user interface configured to enable selection of two or more business entity types each associated with a different model layer framework.

Implementations can include one or more of the following features. For example, the SADL definition may be programming language independent of a model layer framework. The SADL engine may include a CRUD module configured to delegate calls associated with the at least one of create, read, update and delete operations to a runtime associated with a corresponding business entity type. The SADL engine may include a query module configured to delegate a query to an Advanced Business Application Programming (ABAP) Query Interface.

For example, generating a SADL definition may include generating a SADL definition for each item of each of the plurality of business entities, the SADL definition including a data source a binding and a name. The steps may further include receiving an indication of a selection of a business entity, receiving an indication of a selection of business entity property associated with the business entity, the business entity property being one of a service and an item, and mapping the selected business entity property to the business entity.

Yet another embodiment includes a non-transitory computer-readable storage medium having stored thereon computer executable program code which, when executed on a computer system, causes the computer system to perform steps. The steps include generating a Service Adaptation Definition Language (SADL) definition for each of a plurality business entities, the SADL definition being based on an intermediate representation of each of the plurality of business entities, publishing the SADL definition as a service of a SADL engine configured to delegate at least one of query, create, read, update and delete operations associated with the business entity.

Implementations can include one or more of the following features. For example, the SADL engine may include a CRUD module configured to delegate calls associated with the at least one of create, read, update and delete operations to a runtime associated with a corresponding business entity type. The SADL engine may include a query module configured to delegate a query to an Advanced Business Application Programming (ABAP) Query Interface.

For example, the SADL engine may include a CRUD module configured to receive an indication that a CRUD service has been triggered, and return at least one of a notification and a message based on an execution of the triggered service. Generating a SADL definition may include generating a SADL definition for each item of each of the plurality of business entities, the SADL definition including a data source a binding and a name. Translating the business entity into an intermediate representation may include converting each of the data entities into metadata including a mapping of relationships between business entities.

For example, translating the business entity into an intermediate representation may include translating a procedure into a string of symbols having a common language. The SADL definition may be programming language independent of a model layer framework.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 3A and 3B illustrate block diagrams of consumption layer objects and model layer frameworks.

Figure 1A:
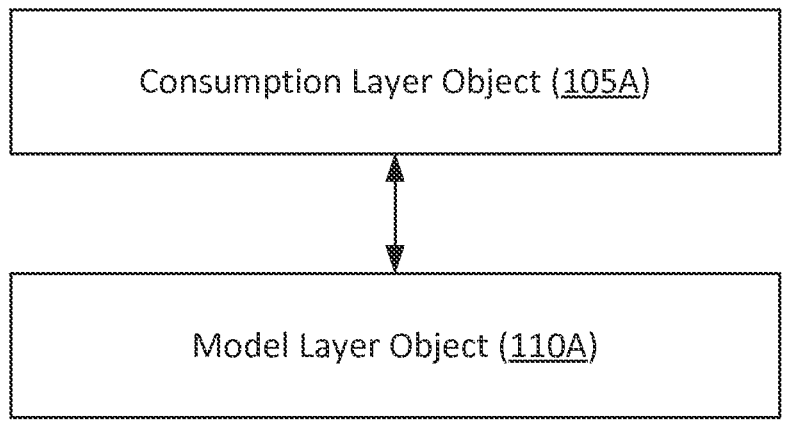
FIGS. 1A and 1B illustrate a block diagram of an interaction between objects according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. The use of similar or identical reference numbers in the various drawings is intended to indicate the presence of a similar or identical element or feature.

Figure 1B:
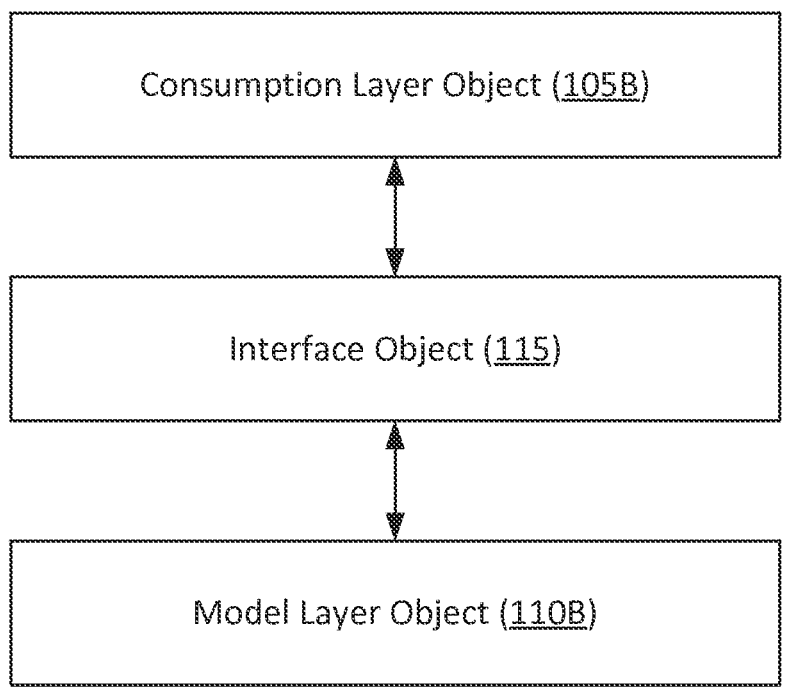

FIGS. 1A and 1B illustrate a block diagram of an interaction between objects according to at least one example embodiment. As shown in FIG. 1A a consumption layer object 105A is communicatively coupled with a model layer object 110A. In the example of FIG. 1A, the consumption layer object 105A may be any object (e.g., an element of a computing system) configured to consume (e.g., read, write, update, etc.) data. The model layer object 110 may be a business object (e.g., a class of objects) defining objects of the business world including, for example, a data model, functions, relationships and an associated business logic (described in more detail below with regard to FIG. 2). The model layer object 110A may be implemented on a framework (e.g., Advanced Business Application Programming (ABAP)). In one or more example implementations, there may be several frameworks on which several model layer objects 110A are implemented. Accordingly, developing consumption layer objects 105A may require special knowledge of and special skill for utilizing each of the several model layer objects 110A.

Therefore, example implementations may include an interface object 115 configured to implement several model layer objects 110B in a common structure such that consumption layer objects 105B may utilize a single structure in order to interface with several model layer objects 110B. In other words, interface object 115 presents a uniform structure or framework utilized by a developer of a consumption layer object 105B. In other words, a business object associated with a model layer object 110B may be de-coupled from the framework used to implement the business object such that a developer of a consumption layer object 105B needs no special knowledge of and/or special skill in order to utilize the business object.

Figure 2:
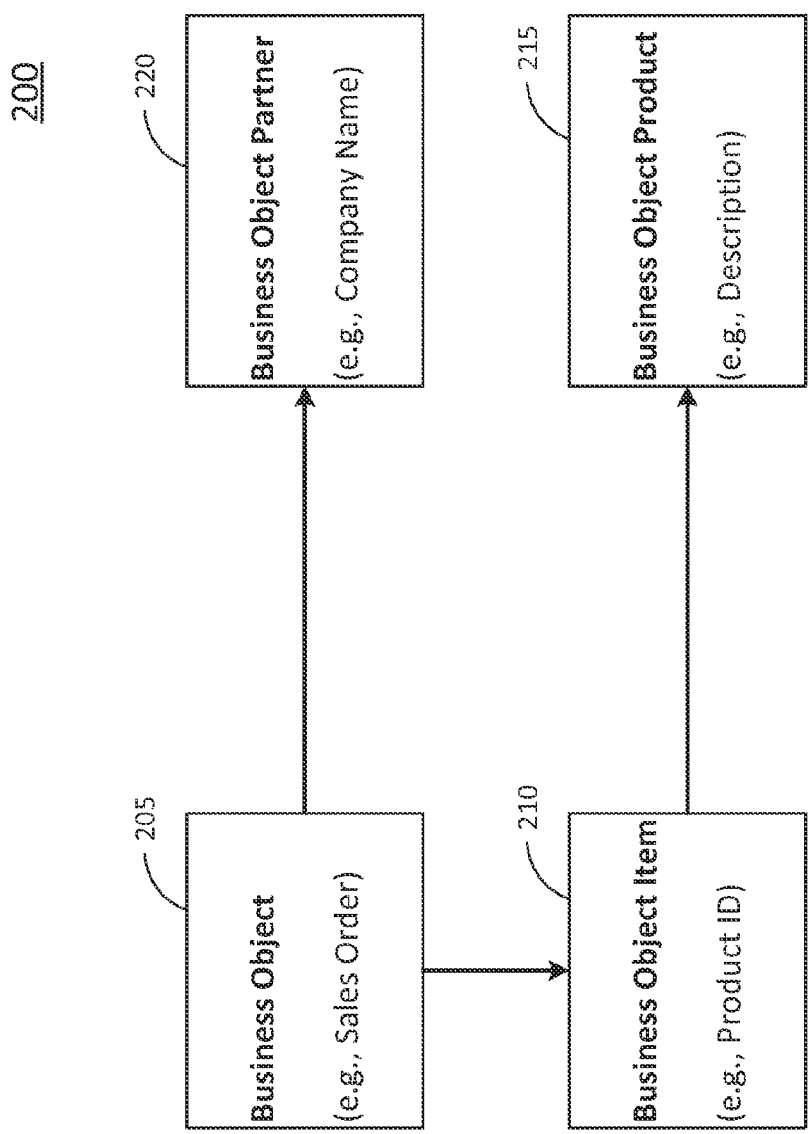
FIG. 2 illustrates a block diagram of a business object data model according to at least one example embodiment.

FIG. 2 illustrates a block diagram of a business object data model according to at least one example embodiment. A notation for describing data models in relational database management systems is sometimes called Entity-Relationship Diagrams (ER-Diagrams). ER-Diagrams may be used to design database tables and their relationships. In several object-oriented programming languages technologies exist that map these data models to class references or representations of the programming language sometimes called OR-Mapping. A business object (e.g., in object-oriented software development) describes objects of the business world including, for example, a data model, functions, relationships and an associated business logic (e.g., BOPF).

As shown in FIG. 2 a business object data model 200 may be, for example, related to a sales object. The business object data model 200 may include at least one business object. For example, the business object data model 200 may include a business object 205 (e.g., sales order), a business object product 215 and a business object partner 220. A business object item 210 and the business object partner 220 may be nodes of the business object 205 (e.g., sales order). Further, the business object item 210 may also have an associated node (e.g., business object product 215). In the example of FIG. 2, the business object 205 may be a sales order object. However, other business objects are within the scope of this disclosure. The business object 205 may link to the business object partner 220 in order to, for example, indicate a business partner (e.g., customer) that has placed a sales order. The business object 205 may link to the business object item 210 (e.g., a sales order item) in order to indicate what is ordered. The business object item 210 may indicate, for example, a Product ID, a quantity ordered (e.g., GrossAmount, NetAmount), and/or the like. The business object item 210 may link to the business object product 215. The business object product may indicate internal information about the ordered product (e.g., ID, Description, and/or the like).

In some systems the business objects (e.g., business object 205, business object item 210, and the like) may be elements of different systems (e.g., sales order management (SO) systems, product management systems, inventory management systems, enterprise resource planning (ERP) systems, and the like). Accordingly, business objects may be implemented on different frameworks or model layers (e.g., model layer object 110A). For example, the frameworks may include business object processing framework (BOPF), business object layer (BOL), service provider interface (SPI), or low level representations such as DDIC tables/views, core data services, HANA views, and the like. Therefore, in order to integrate the sales object, a developer may require special knowledge of and special skill for utilizing each of the frameworks or accessing these data models.

However, according to example embodiments, an interface object or framework or entity (e.g., interface object 115) may be used to de-couple the business object from the framework used to implement the business object such that a developer needs no special knowledge of and/or special skill in order to utilize the business object. In other words, the developer may only need the skills associated with a single interface (e.g., interface object 115) instead of the skills associated with the many frameworks that business objects can be associated with.

FIGS. 3A and 3B illustrate block diagrams of consumption layer objects and model layer frameworks. In the example shown in FIGS. 3A and 3B, there are several blocks associated with a consumption layer and there are several blocks associated with a model layer. The blocks associated with the consumption layer include floor plan manager (FPM) 305A, 305B (e.g., SAP Floor Plan Manager®), gateway (GW) 310A, 310B (e.g., NetWeaver Gateway®), and the like.

FPM is a framework for developing self-service applications using Web Dynpro® for Java®. FPM is configured to ensure that self-service applications follow a consistent pattern or road map. GW is a set of add-ons configured to provide the ability to make an HTTP(S) request in order to access data.

The blocks associated with the model layer include business object layer (BOL) 320A, 320B, business object processing framework (BOPF) 325A, 325B, core data services (CDS) 330A, 330B, data dictionary (DDIC) 335A, 335B, service provider infrastructure (SPI) 340A, 340B, enterprise search model 345A, 345B, and the like.

In order to abstract from different DBMS DDIC is a native Advanced Business Application Programming (ABAP) component configured to define database tables and views. These tables and views can natively be handled in ABAP as first class citizens. Persistence classes in object oriented (OO) ABAP provides classes that are representations of tables. The classes combine data models with business logic. ABAP persistence classes are a typical OR-Mapping infrastructure.

Business Object Processing Framework (BOPF) is a framework configured to provide an end-to-end development experience. BOPF supports the modeling of the data model and takes care for the persistency. BOPF enables the implementation of business logic as actions, determinations and validations. BOPF is also configured to enable a consistent logical unit of work (LUW) handling (e.g., the span of time during which any database updates must be performed). Business Object Layer (BOL) is an abstraction layer for legacy code. BOL provides an infrastructure to build a business model on top of legacy code with a harmonized Application Programming Interface (API) configured to enable a model-based consumption in higher layers. The framework supports LUW/transactional handling but does not care about the way the data is persisted.

Service Provider Interface (SPI) is similar to BOL but does not provide design time to model business objects. The SPI is defined via APIs.

Enterprise Search Model is an infrastructure supporting fast search and query operations on replicated data in Text Retrieval and information Extraction (TREX) (e.g., a search engine) or on original data in a High Performance Analytic Appliance (HANA) (e.g., an in-memory, column-oriented, relational database management system). The enterprise search model is an infrastructure configured to support fast search and query operations on replicated data. Enterprise search models are views on the data that can be connected with associations. Therefore, Enterprise Search Model can be described as Business Objects without business logic. The associations are used for navigation purposes on generic applications consuming these models.

A Business Object Repository (BOR) is a registry for function modules. BOR functions can be registered to enable a harmonized consumption.

A core data services (CDS) is a concept for HANA and ABAP on HANA in order to describe business objects as first class citizens. CDS is configured to enable the definition of query languages native syntax (e.g., DDIC, HANA) to work with the business objects.

As shown in FIG. 3B, one or more of the FPM 305B, GW 310B, and the like may be communicatively coupled to one or more of the BOL 320B, BOPF 325B, CDS 330B, DDIC 335B, SPI 340B, enterprise search model 345B, and the like. Typically the coupling is via a software interface (e.g., custom software code) that is different for each coupled pairing. In other words, the interface coupling FPM 305B to BOL 320B is different than the interface coupling FPM 305B to BOPF 325B. Because the interface coupling is different for each coupled pairing, developing consumption layer objects (e.g., FPM 305B, GW 310B, and the like) may require special knowledge of and/or special skill for utilizing each of the several model layer objects (e.g., BOL 320B, BOPF 325B, CDS 330B, DDIC 335B, SPI 340B, enterprise search model 345B, and the like).

Figure 4:
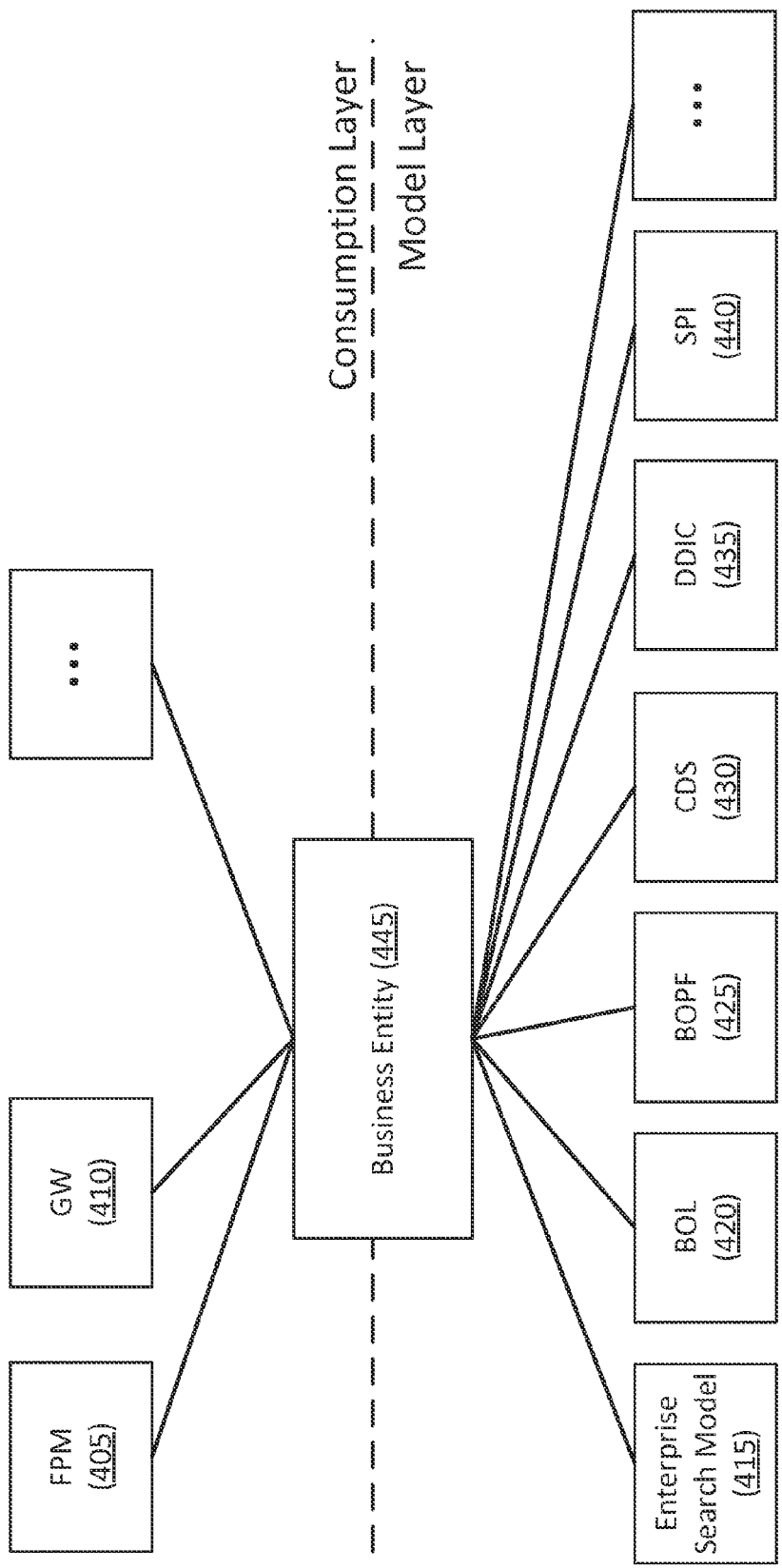
FIG. 4 illustrates a block diagram of a Business Entity interfacing between consumption layer objects and model layer frameworks according to at least one example embodiment.

FIG. 4 illustrates a block diagram of a business entity interfacing between consumption layer objects and model layer frameworks according to at least one example embodiment. In the example shown in FIG. 4, there are several blocks associated with a consumption layer and there are several blocks associated with a model layer. The blocks associated with the consumption layer include floor plan manager (FPM) 405 (e.g., SAP Floor Plan Manager®), gateway (GW) 410 (e.g., NetWeaver Gateway®), and the like. The blocks associated with the model layer include enterprise search model 415 (e.g., NetWeaver Enterprise Search®), business object layer (BOL) 420, business object processing framework (BOPF) 425, core data services (CDS) 430, data dictionary (DDIC) 435, service provider infrastructure (SPI) 440, and the like. Straddling the consumption layer and the model layer is a business entity 445 module or object or abstraction. Business entity 445 may be configured to implement several model layer objects (e.g., enterprise search model 415, BOL 420, BOPF 425, CDS 430, DDIC 435, SPI 440, and the like) in a common structure such that consumption layer objects (e.g., FPM 405, GW 410, and the like) may utilize a single structure in order to interface with several model layer objects. In other words, business entity 445 presents a uniform structure or framework utilized by a developer of a consumption layer object (e.g., FPM 405). In other words, a business object associated with a model layer object (e.g., BOL 420) may be de-coupled from the framework used to implement the business object such that a developer of a consumption layer object (e.g., FPM 405) needs no special knowledge of and/or special skill in order to utilize the business object.

Accordingly, business entity 445 may be a framework configured to enable consumption of different business object models, and other entity-based models, for example, DDIC tables and views, in a uniform way. Knowledge of the details of the modeling frameworks, such as BOPF or BOL is not required, as such the business entity 445 model exposes all the required information to a user interface configured to develop consumption layer objects (e.g., FPM 405).

Business entity 445 can be implemented using an adapter including a runtime interface or API, metadata and at least one interface associated with each of the model layer objects. The runtime interface may be configured to interface with the at least one interface and at least one consumption layer tool during an implemented operation (e.g., accessing data associated with a business object). For example, the FPM may be configured to update an element data entry (e.g., completion date). Accordingly, the runtime interface may be configured to receive (or otherwise acquire) the element to be updated and the new data. The runtime interface may access the appropriate interface and call, implement and/or execute the function, code, tool, and/or the like associated with the interface for updating the element data entry. For example, in an interpreted environment the runtime interface may map a function, code and/or tool associated with a business object. For example, in a compiled environment, the runtime interface may be compiled together (e.g., as source code) with the interface to include the function, code and/or tool associated with a business object.

Metadata may include any data and/or data associations for the runtime interface, the interface, and/or objects in the model layer (e.g., BOL 420). For example, metadata may include business objects in an object in the model layer, business object associations (e.g., as an ER-diagram), elements of a business object, function calls in a business object, and/or the like. The at least one interface may be configured to implement several model layer objects (e.g., BOL 420) in a common structure such that consumption layer objects may utilize a single structure in order to interface with several model layer objects. In other words, interface object presents a uniform structure or framework utilized by a developer of a consumption layer object. In other words, a business object associated with a model layer object may be de-coupled from the framework used to implement the business object such that a developer of a consumption layer object needs no special knowledge of and/or special skill in order to utilize the business object.

According to example embodiments, a consumption layer artifact (e.g., GW, FPM, ALV UI, views, and/or the like) can be built using any tooling (e.g., Eclipse and/or a WebIDE) on top of any business model with generic runtime support for query pushdown or transactional scenarios via delegation to the business model runtime. For example, SADL can be used as a generic consumption layer and can be used for any UI Technology or other consumption scenarios (e.g., Excel-Export, Web-Services, Workflow Integration, and/or the like). The generic consumption layer can enable capabilities including, for example, view building, providing an infrastructure to consume any ER-like business model based on SADL, support Read-Only Optimized access via Query-Pushdown to HANA, support Transactional Scenarios delegating to the business model runtime (e.g., BOPF runtime), native Integration into existing development environment (e.g., of a UI Technology) without additional repository, tooling or design time artifacts, reusable editors (e.g., Eclipse or Web-IDE) supporting all scenarios can be provided, and harmonized tooling with improved development experience and lower TCD/TCO.

Figure 5:
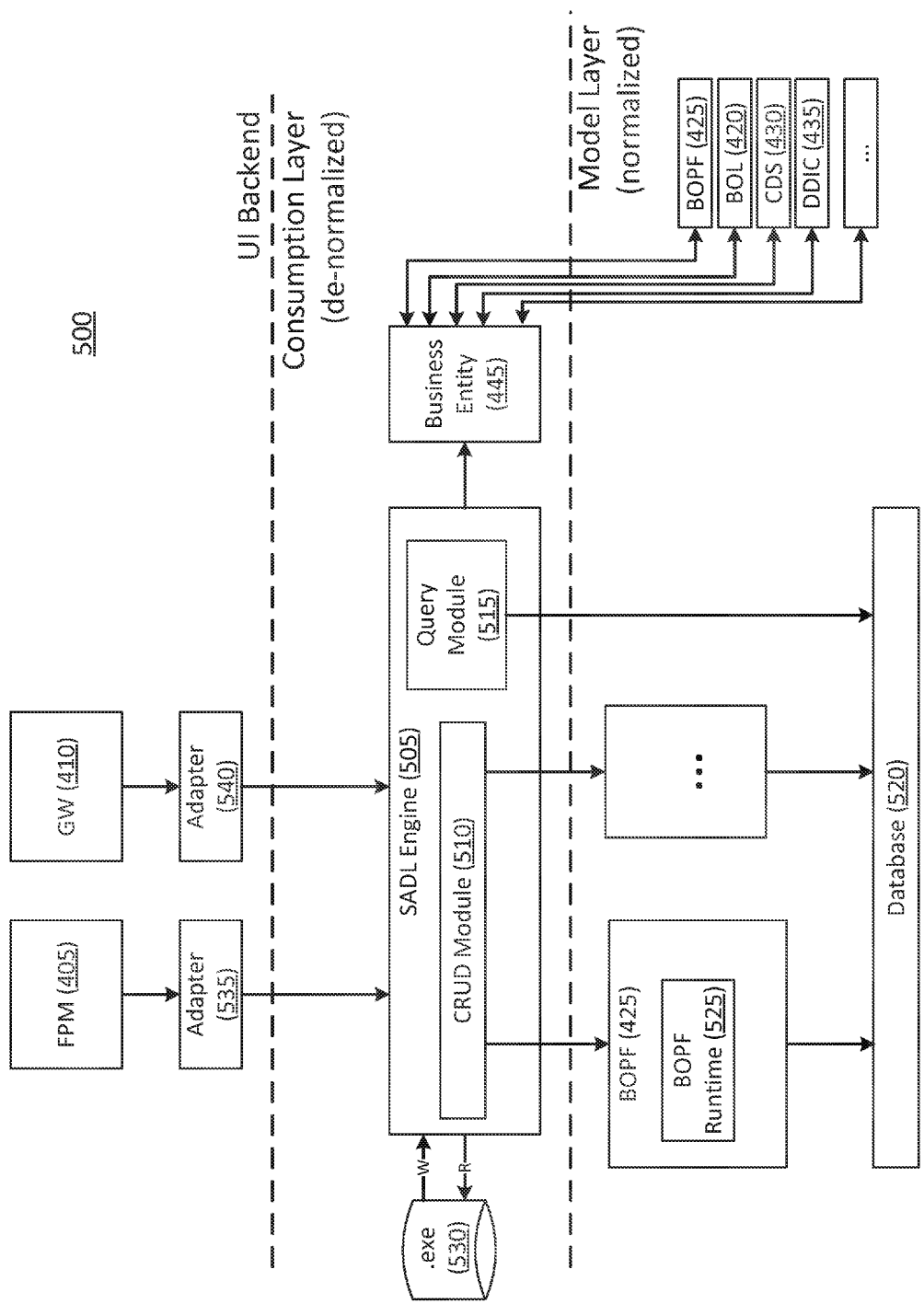
FIG. 5 illustrates a block diagram of a system according to at least one example embodiment.

FIG. 5 illustrates a block diagram of a system according to at least one example embodiment. As shown in FIG. 5, the system 500 includes FPM 405, GW 410, BOPF 425, BOL 420, CDS 430, DDIC 435, etc., and Business entity 445 each described above. The system 500 further includes a Service Adaptation Definition Language (SADL) engine 505, a create/read/update/delete (CRUD) module 510, a query module 515, a database 520 and an executable 530. As shown in FIG. 5, the BOPF 425 includes a BOPF runtime 525. The database 520, the BOPF 425, the BOL 420, the CDS 430 and the DDIC 435 are included in a model (or normalized) layer. The SADL engine 505 and the business entity 445 are included in a consumption (or de-normalized)

layer. The FPM 405, GW 410, adapter 535 and adapter 540 are included in a UI backend.

The CRUD module 510 may be configured to delegate calls to the business model runtime. For example, a BOPF read may be delegated to the BOPF runtime 525. The query module 515 may be configured to delegate to the ABAP Query Interface (described in more detail below) a query request (e.g., oData getEntitySet( )) such that the query request is executed on the database 520 (e.g., HANA) with special features like text-search and paging on the database 520.

The BOPF runtime 525 may call, implement and/or execute the function, code, tool, and/or the like in order to create, read, update and/or delete an element data entry. For example, the BOPF runtime 525 may map a function, code and/or tool associated with a business object including data associated with the database 520.

The executable 530 may load (e.g., begin execution) when runtime relevant information is desired. For example, the executable 530 may include associated metadata related to, for example, a business object. If the metadata is relevant for an action (e.g., function call, look-up, definition, and the like), the executable 530 may load and provide the metadata.

Adapter 535 may be configured to provide generic feeder classes between FPM 405 and SADL engine 505. A feeder class provides a link between an application (e.g., SADL engine 505) and a user interface (e.g., FPM 405). For example, the feeder class may be based on a predefined interface definition, providing all (e.g., most, substantially all) necessary methods and corresponding signatures to standardize the communication between the application and the user interface. Adapter 540 may be configured to provide code (e.g., Destination Point Code) delegating functions to the SADL runtime.

Figure 6A:
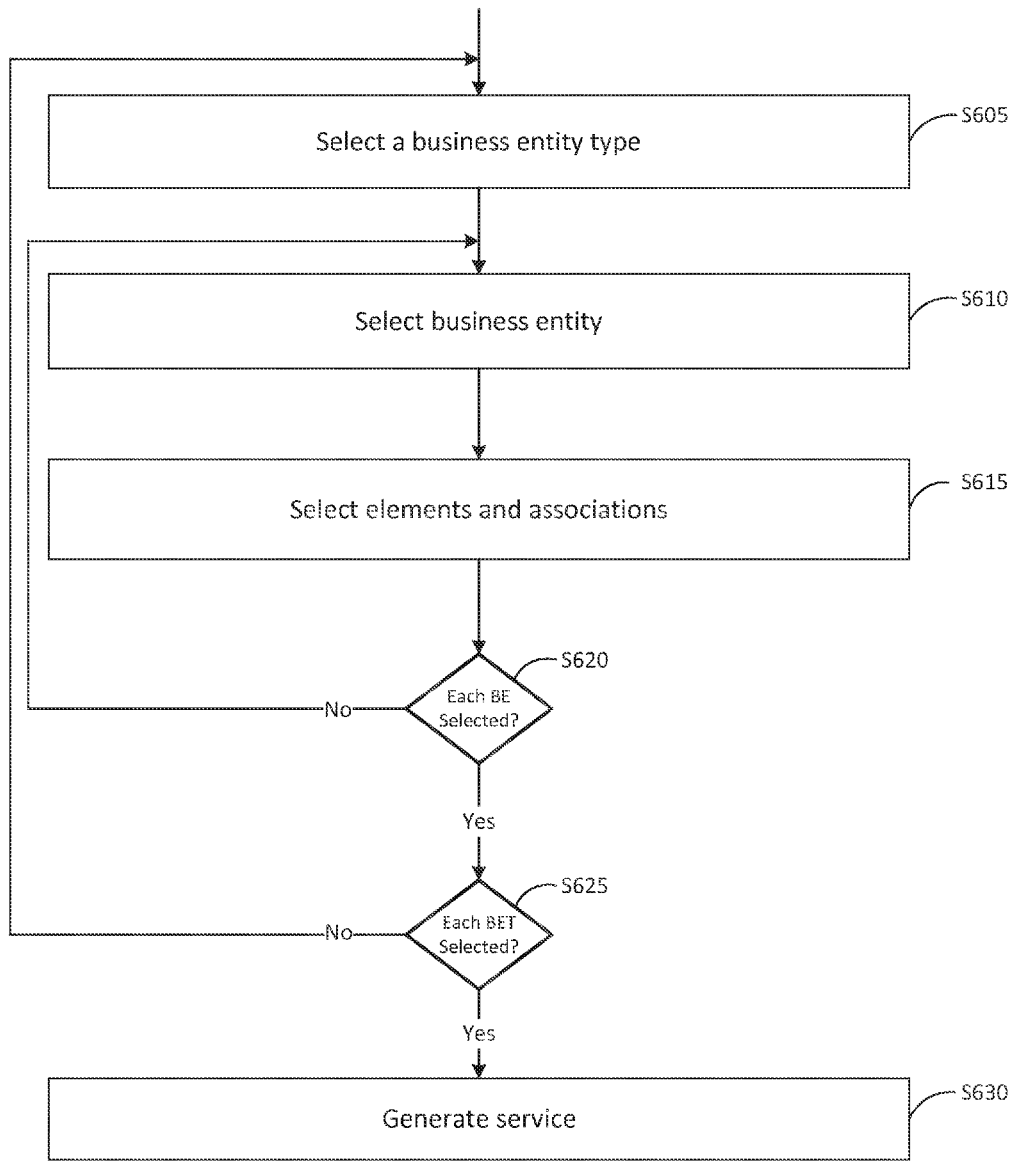
FIGS. 6A, 6B and 6C illustrate flowcharts according to at least one example embodiment.
Figure 6B:
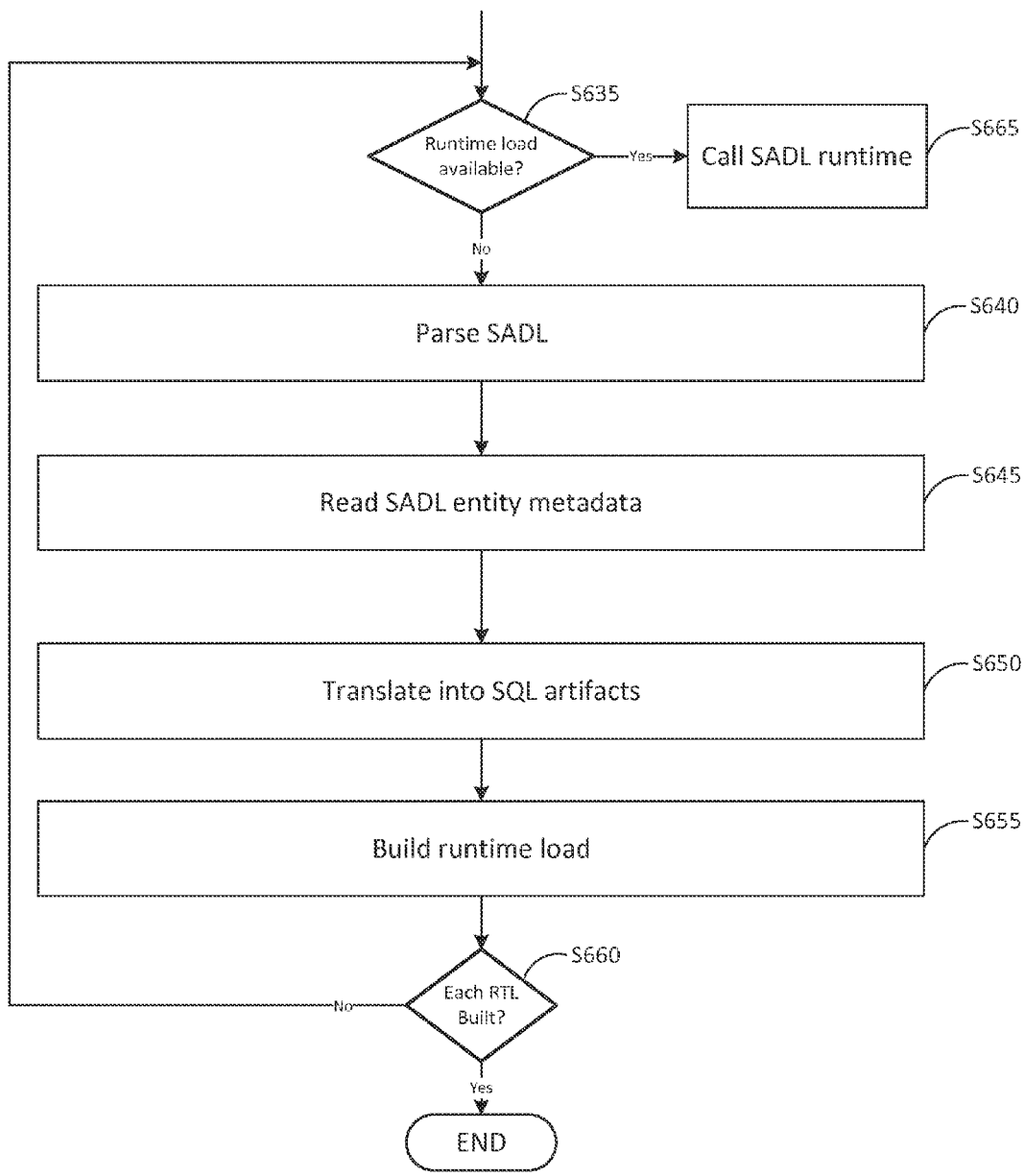
Figure 6C:
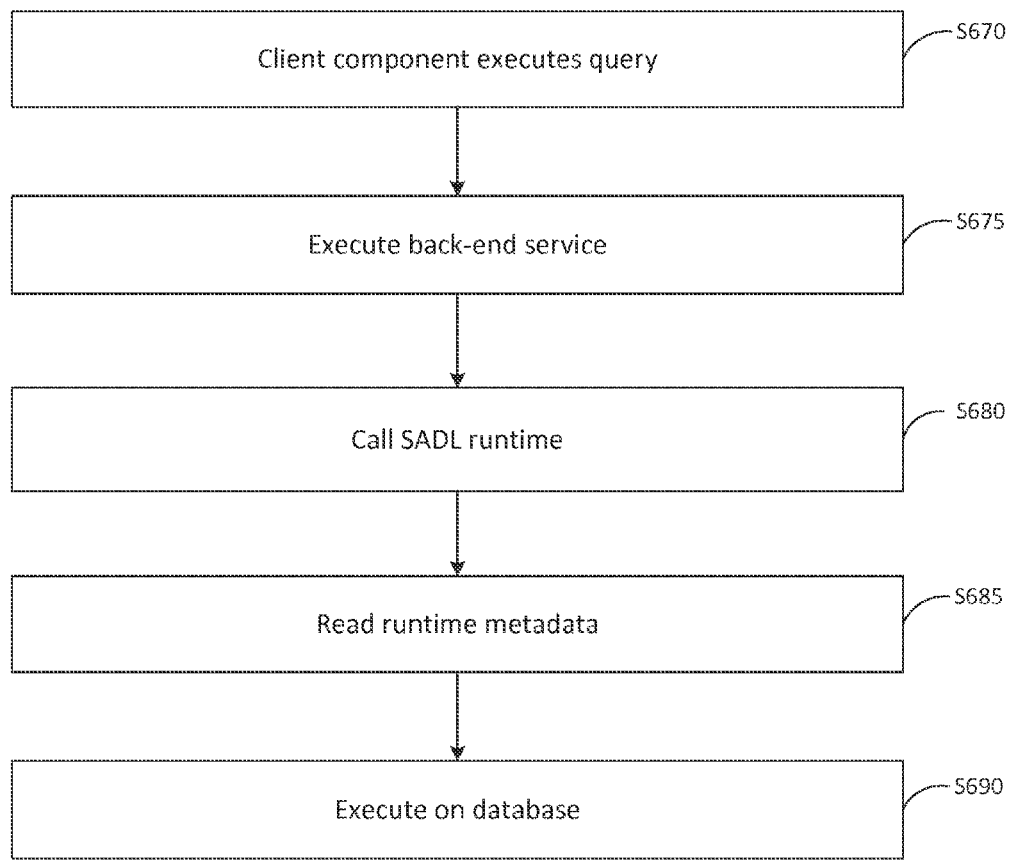
Figure 13:
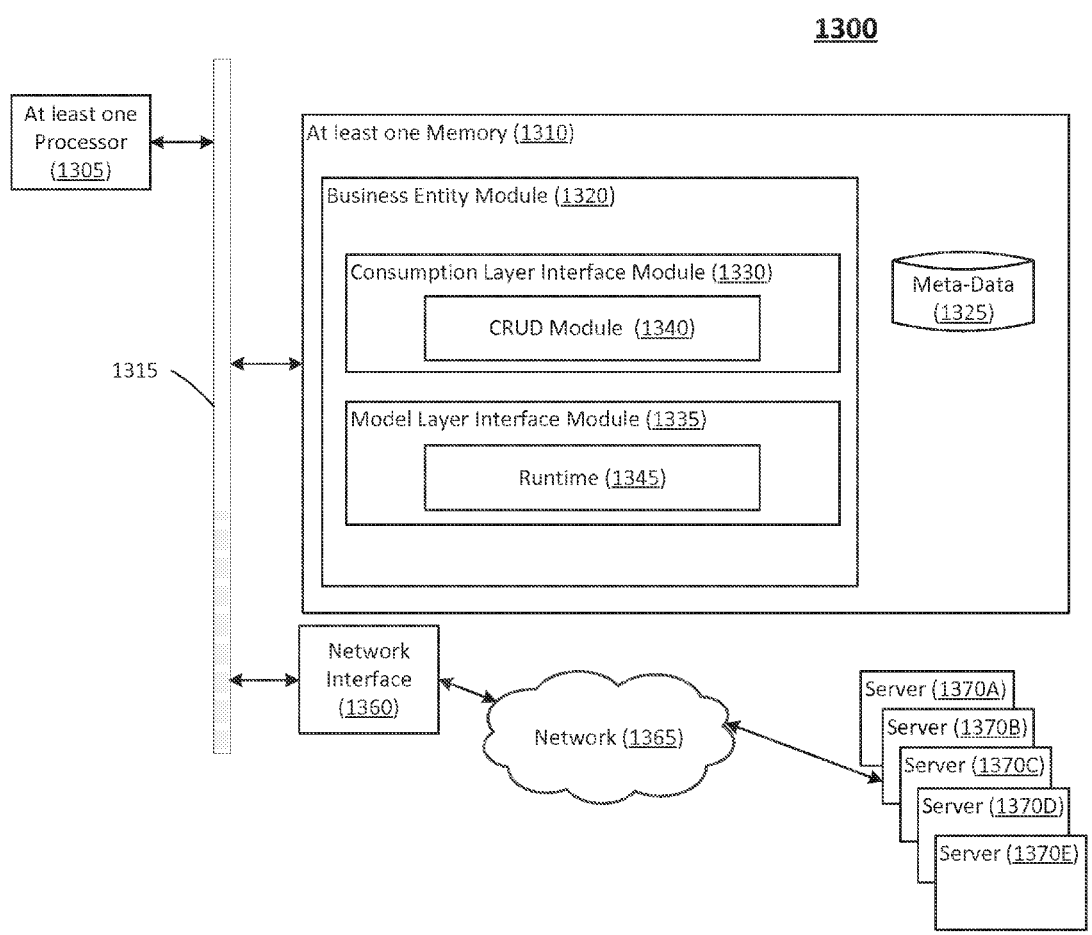
FIG. 13 illustrates a block diagram of a system according to at least one example embodiment.

FIGS. 6A, 6B and 6C illustrate flowcharts according to at least one example embodiment. The steps described with regard to FIGS. 6A-6C may be performed due to the execution of software code stored in a memory (e.g., at least one memory 1310) associated with an apparatus (e.g., as shown in FIG. 13) and executed by at least one processor (e.g., at least one processor 1305) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 6A-6C.

FIG. 6A illustrates a design time scenario in which a developer (e.g., an application developer) may be designing an application (e.g., building a query) using a tool such as GW (e.g., GW 410). As shown in FIG. 6A, in step S605 a business entity type is selected. For example, a BOPF (e.g., BOPF 425) or a DDIC (e.g., 435) business entity type or framework may be selected. The selection may be performed using a user interface (e.g., a consumption layer user interface) as shown in, for example, FIG. 7A or 7B. For example, a window associated with the user interface may display at least one business entity type for selection.

In step S610 a business entity (associated with the business entity type) is selected. For example a table, a view, a procedure, a function, a routine and the like may be selected. The business entity may be associated with one or more business objects. For example, a table including a manufacturing item may be associated with a bill of material business object, a sales order business object, an item business object and the like. The selection may be performed using a user interface as shown in, for example, FIG. 7A or 7B. For example, a window associated with the user interface may display at least one business entity (associated with a selected business entity type) for selection.

In step S615 elements and associations are selected. For example, if the business entity is a table or a view, at least one data object, field or key of the table or view may be selected as an element. For example, if the business entity is a procedure, function or routine, an input variable (e.g., for create or update) or output (e.g., for a read) may be selected as the element. For example, a table parent/child (e.g., an association between a field in one (parent) table and field in another (child) table) association may be selected as an association. For example, an association between business objects (e.g., an association between a sales order business object and an item business object) may be selected as an association. The selection may be performed using a user interface as shown in, for example, FIG. 7A or 7B. For example, a window associated with the user interface may display at least one element and/or association (associated with a selected business entity) for selection.

In step S620 if the desired (e.g., all or substantially all) business entities have been selected, processing continues to step S625. Otherwise, processing returns to step S610. In step S625 if the desired (e.g., all or substantially all) business entity types have been selected, processing continues to step S630. Otherwise, processing returns to step S605. For example, the developer may be developing at least one query that spans across a plurality of business entities and business entity types. Accordingly, the developer may first (but not necessarily first) select the desired business entities and corresponding elements/associations for a business entity type. The developer may then select a different business entity type and repeat the process as many times as necessary to develop or generate the desired query.

In step S630 a service is generated. The service may be based on the previous selections. In other words, the service may be based on a query based on the previous selections. Generating the service may include generating SADL metadata based on the previous selections. Generating SADL metadata may include converting the selected entities/elements/associations into a data structure or metadata (e.g., as described above). Generating SADL metadata may include translating language (or code) associated with the procedure(s) into a string of symbols having a common or standard language (e.g., machine language or portable language). Generating SADL metadata may include generating metadata including a mapping of relationships between business objects (e.g., a relationship between a sales order entry object and a sales order item object).

Generating SADL metadata may include generating a SADL definition. A SADL definition can include a sadl:namespace, a sadl:definition and a sadl:dataSource where the type of the data source (for example, a business object), the binding (for example an entry path of the business object) and a name (which can be used as alias in an XML document), are specified. A syntactic analysis may be performed on the data structure and/or the translated string of symbols to ensure uniqueness of namespace prefixes.

In a sadl:definition, the sadl:resultSet can also be defined. The sadl:resultSet can contain a sadl:structure with the attributes and substructures. In a sadl:atttibute, the name of the attribute and the binding can be specified. The binding can contain, in an Xpath-like syntax, an access path for mapping to the business object data. For example, such an approach can provide either direct business object attribute access of the node as specified in the binding of the sadl:dataSource (for example using '/' for subcomponent access in the attribute type) or business object attribute access with sub path specification via business object associations (for example with a namespace prefix such as "assoc:" or "ass:" to denote an association) using '/' for the association links.

A sadl:definition can contain a list of XML namespace definitions, possibly including but not limited to the UUID of the SADL, the date and time of the SADL (CreateLastChange), one or more sadl:dataSource definitions, a list of sadl:callbacks (can be empty), and a sadl:resultSet. A sadl:dataSource can advantageously contain the data in some type. If the data source type is a business object node type, a binding can be defined. Especially when several data sources are specified, naming of the data source can be very helpful. The data source names can be used in the source definition as aliases to distinguish accesses to the different data sources. A sadl:callback can contain the programming language of the callback, the callback's class name, the names of the target business object type, the target node name, and the path ID of the callback. The callback can be used in any binding definition where an association can occur by specifying the callback name, for example with a prefix such as "clb:". Filtering by an association filter can also be provided. Filter expressions can be defined in brackets. In an implementation, an attribute binding can allow only one-to-one associations if a filter is not specified.

FIG. 6B illustrates a compile time scenario in which a developer (e.g., an application developer) may be compiling an application using including a query developed based on the steps described in FIG. 6A. As shown in FIG. 6B, in step S635 a determination is made (e.g., by a processor) as to whether or not a runtime load (e.g., a SADL runtime) is available. For example, the runtime load may not be available because a runtime load has not been previously built or generated. If a runtime load is available, processing continues to step S665 where a SADL runtime is called. Otherwise, processing continues to step S640.

In step S640 SADL is parsed. For example, parsing may include checking the syntax of the source code and creating a compiler format of adaptation data necessary to provide runtime access to application data. Parsing can include a check of the uniqueness of the namespace prefixes. Therefore a sadl:definition can contain a sadl:dataSource where the type of the data source (for example, a business object), the binding (for example an entry path of the business object) and a name (which can be used as alias in an XML document).

In step S645 a SADL entity metadata is read. For example, the generated service described above with regard to FIG. 6A may include an associated metadata (e.g., SADL metadata). This associated metadata may be read as SADL entity metadata during this compile operation.

In step S650 at least one of the parsed SADL and the SADL entity metadata may be translated into structured query language (SQL) artifacts. Artifacts may include SQL views, SQLScript and the Application Functions. Accordingly, translating SADL entity metadata may include generating SQL statements representing elements of a query defined by the SADL entity metadata. Additional, non-limiting, examples of SQL artifacts being part of the generated statements: include requested elements (query output), restricting clauses representing user selection, restrictions corresponding to the limitations in the user authorizations, grouping and sorting criteria, parameters, localization/language indicators, and the like.

In step S655 a runtime load is built. For example, the runtime load can be built (e.g., compiled) based on at least one of the parsed SADL, the SADL entity metadata and the translated SQL artifacts. The runtime load can contain an execution plan indicating how to retrieve data from a data source (e.g., database 520). In other words, the runtime load indicates how a query defined by the SADL metadata should be executed on the data source. For example, whether or not the query should be delegated to the data source for execution. Building the runtime load may include generating runtime metadata. In one example implementation, each runtime load is associated with unique runtime metadata (e.g., one file per runtime load). In an alternative implementation, runtime metadata is aggregated (e.g., one file for all runtime loads). In an example implementation, the runtime load may be configured to serve as fast access to the SADL metadata and can be invalidated and rebuilt when any relevant property of the corresponding business entity changes. This invalidation can be based on checksums over the properties of the included entities, or timestamps represented the last change.

In step S660 a determination is made as to whether or not each desired runtime load is built. If the desired runtime load(s) are built, the process ends. Otherwise, processing returns to step S635.

FIG. 6C illustrates a runtime scenario in which an end user (e.g., an operator of a client device) may be using an application including a query developed based on the steps described in FIG. 6A and compiled based on the steps described in FIG. 6B. As shown in FIG. 6C, in step S670 a client component executes a query. For example, a user interface (e.g., an application GUI) developed and compiled as described above may be executing on a client computer (e.g., a personal computer, a hand held device, and the like). During execution the user interface triggers a request for data resulting in the execution of the query.

In step S675 a back-end service is executed. For example, a server (e.g., a networked computing device including at least one processor and memory) including, for example, at least one of the consumption layers (and associated components/elements/modules) described above may include a service (e.g., the service including associated SADL metadata described above). The service may be communicatively coupled via the server to the user interface executing on the client computer. Accordingly, the service may be triggered to execute based on the execution of the query on the client computer.

In step S680 a SADL runtime (e.g., runtime load) is called. The compiled component (e.g., runtime load) described above with regard to FIG. 6B is called. Calling the SADL runtime causes the compiled code to execute on the server including at least one of the model layers (and associated components/elements/modules) described above.

In step S685 runtime metadata is read. As described above, when the runtime load is built, runtime metadata may be generated. This runtime metadata is read by the server (e.g., a processor of the server) in order to load information associated with the query (e.g., whether or not the query is to be executed by the database or by the server). Finally, in step S690 the query executes on the database.

Figure 7A:
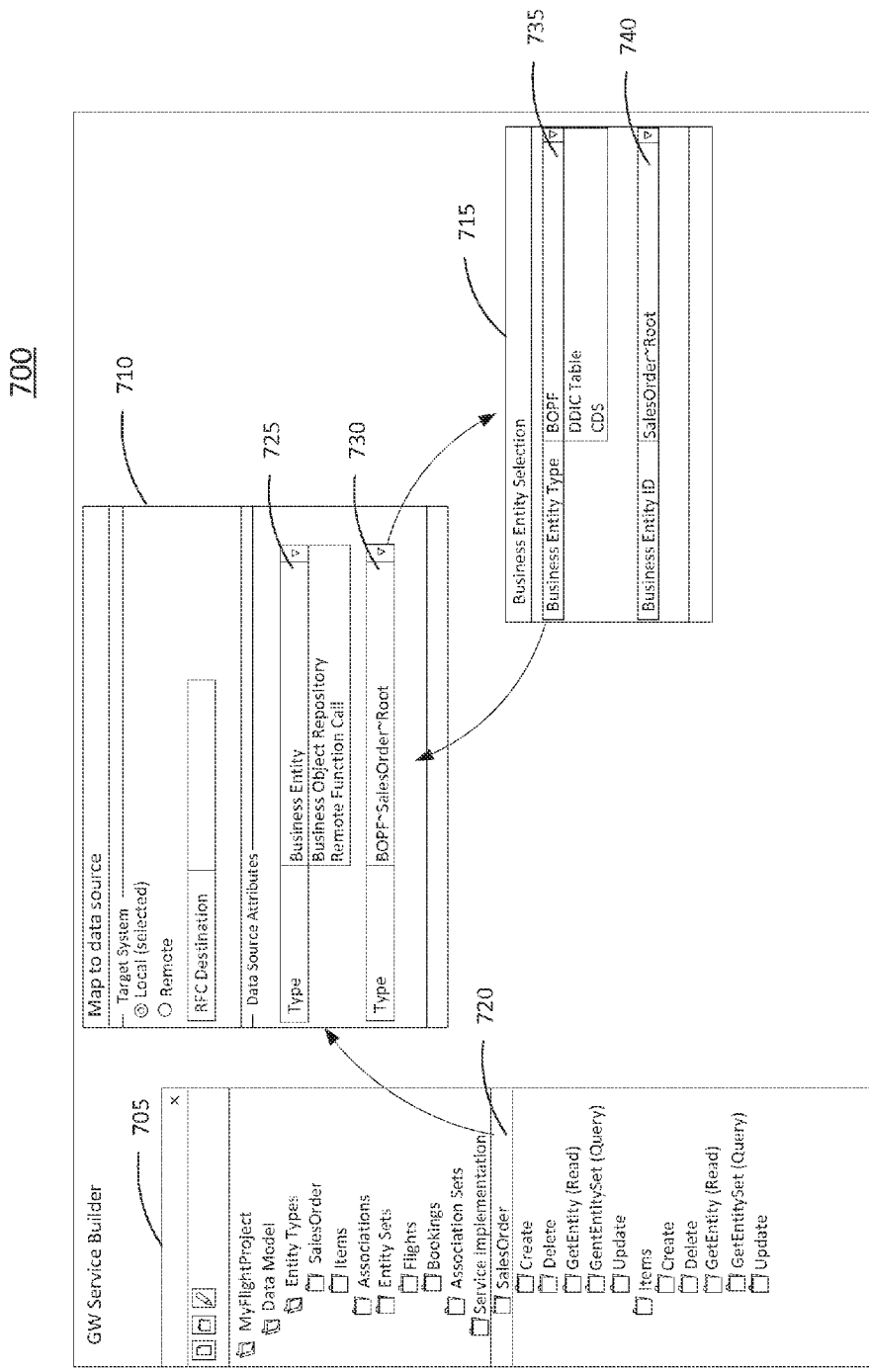
FIGS. 7A and 7B illustrate user interfaces according to at least one example embodiment.
Figure 7B:
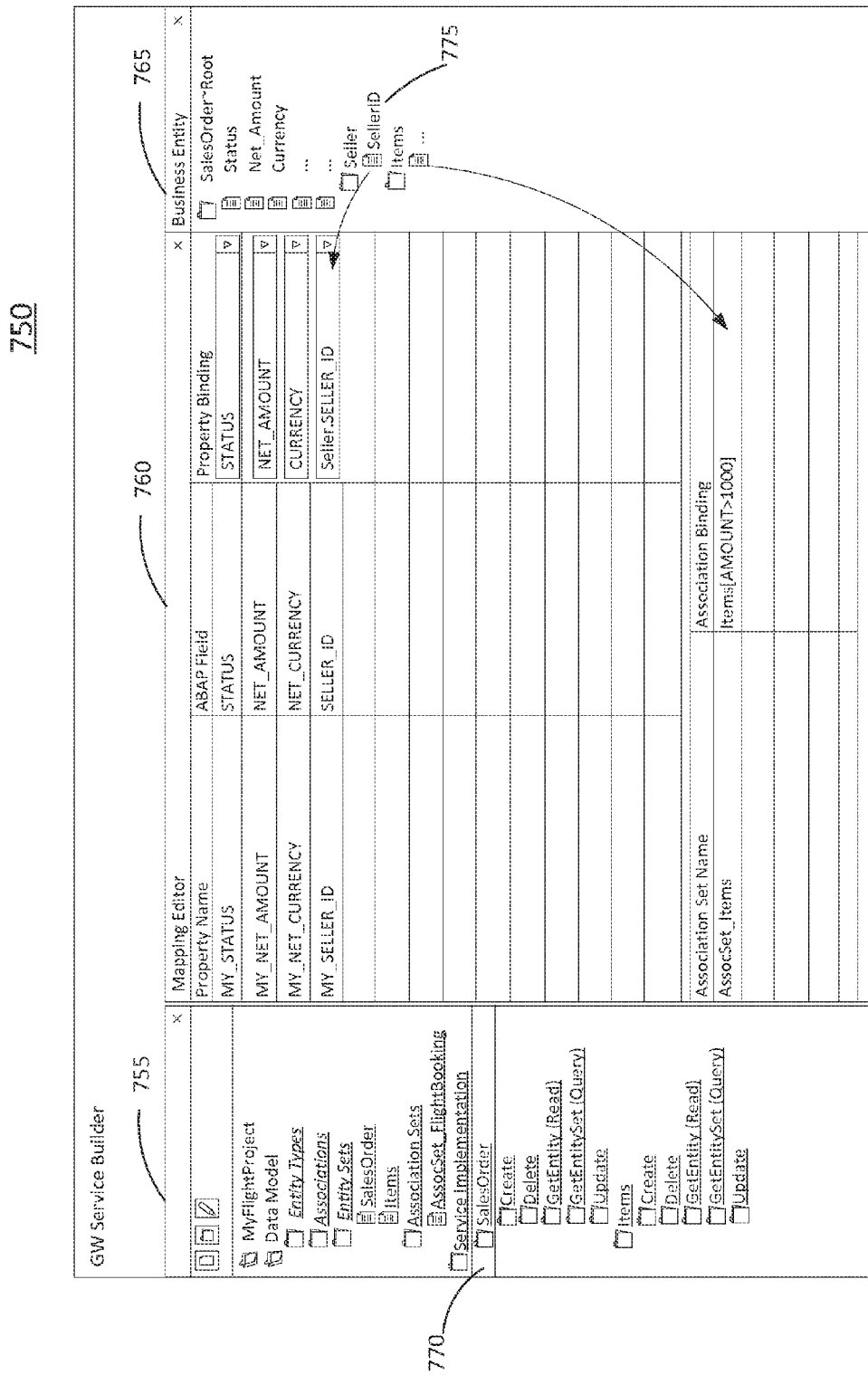

FIGS. 7A and 7B illustrate user interfaces (UI) according to at least one example embodiment. The user interfaces (e.g., UI 700, UI 750) may be used to develop a user interface for use by an end user to, for example, view/create/delete data stored in a database implemented using, a BOPF framework. The user interface for use by an end user may include a portion of UI 700, UI 750. The user interface for use by an end user may compiled and/or interpreted prior to and/or while in use by the end user.

As shown in FIG. 7A, a UI 700 (e.g., a gateway (GW) service builder UI) configured to build a gateway (e.g., GW 310A, 310B). The UI 700 may include windows 705, 710, 715. The first window 705 may include a dropdown list of business objects and business object services. Selecting (e.g., clicking on, hovering over) one of the items in dropdown list, for example, SalesOrder 720, may open the second window 710. The second window 710 may be configured to enable a developer to map a data source to the selected (e.g., selected item in window 705) item. In this example implementation, the developer can choose from a local or remote system and data source.

For example, the second window 710 shows a selection of a SADL Entity type 725 and a BOPF~SalesOrder~Root type 730 (which may be enabled following selection of the SADL Entity type 725). Selecting (e.g., clicking on, hovering over) the BOPF~SalesOrder~Root type 730 may open the third window 715. The third window 715 may be configured to enable the developer to select the type of framework associated with the SADL entity. In this example implementation, the developer can choose from a BOPF, DDIC Table or CDS as the type of framework associated with the SADL entity of which BOPF 735 is selected resulting in the return (or mapping) of the SalesOrder~Root 740 to the BOPF~SalesOrder~Root type 730 and thus the SalesOrder 720. In example implementations, data populating one or more of the windows 705, 710, 715 may be based on (or generated using) metadata stored in, for example, metadata 1325 described below. Accordingly, a developer using UI 700 does not have to have complete knowledge of the details of the modeling frameworks, such as BOPF or BOL.

As shown in FIG. 7B, a UI 750 (e.g., a gateway (GW) service builder UI) configured to build a gateway (e.g., GW 310A, 310B). The GW service builder UI 750 may include windows 755, 760, 765. The first window 755 may include a dropdown list of business objects and business object services. Selecting (e.g., clicking on, hovering over) one of the items in dropdown list, for example, SalesOrder 770, may link (or associate, bind or correspond) data entered in the second window 760 to the selected item (e.g., SalesOrder 770). The second window 760 may be configured to enable a developer to map a data source to the selected (e.g., selected item in the first window 755) item. In this example implementation, the developer can create a property having a property name, choose an ABAP field to link to the property and bind the property to an item selected from a SADL Entity in the third window 765.

For example, the second window 760 shows the creation of a property called MY_SELLER_ID which is linked or mapped to ABAP field SELLER_ID with a property binding of Seller, SELLER_ID. In addition, an association binding has been created where Items having a value (amount) greater than 1000 are included. In an example implementation, items associated with the SADL Entity may be dragged and dropped from the third window 765 to a field in the second window 760. For example item Seller, SELLER_ID may be dragged from the third window 765 to a field in the property binding column of the second window 760. In example implementations, data populating one or more of the windows 755, 760, 765 may be based on (or generated using) metadata stored in, for example, metadata 1325 described below. Accordingly, a developer using UI 700 does not have to have complete knowledge of the details of the modeling frameworks, such as BOPF or BOL.

FIGS. 8A-8E illustrate a signal flow according to at least one example embodiment. As shown in FIGS. 8A-8E, an example business object SalesOrderOverview 805 includes associated items (which may also be considered as business objects) sales order 810, business partner 815 and address 820. Sales order 810 includes an associated node (e.g., another business object) items 825. Items 825 include associated items item 830, product 835 and description 840.

Figure 8A:
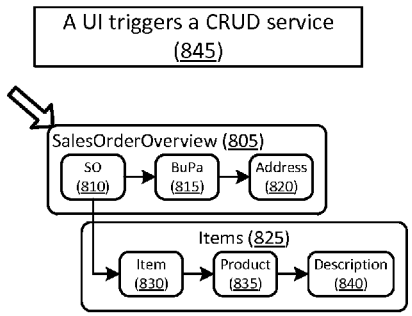
FIGS. 8A-8F illustrate a signal flow according to at least one example embodiment.

Initially, in block 845 a user interface (e.g., a UI described above or a UI developed using a UI described above) triggers a CRUD service (e.g., a read service). For example, the UI (e.g., via interaction of an end user) triggers an action (e.g., click on a button on the UI) that causes a processor on a computer executing (or displaying) the UI to trigger a read of at least one data element associated with a business object. As shown in FIG. 8A, the CRUD service may be associated with, for example, a SalesOrderOverview 805 business object. In an example implementation, the UI triggers functionality (e.g., a service, a program function) associated with CRUD module 510.

Figure 8B:
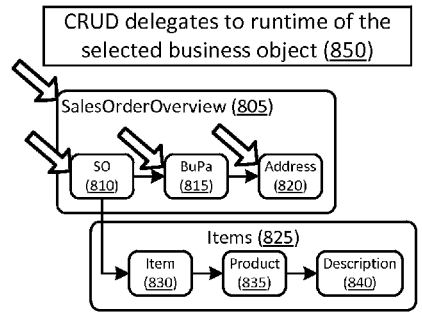

In block 850 CRUD (e.g., CRUD module 510) delegates to a runtime of the selected business object. For example, the CRUD may map the triggered service to a corresponding service in the selected business object. The CRUD the delegates (e.g., calls or forwards) the requested execution of the service to the selected business object. For example, as shown in FIG. 8B, the service can be delegated to one or more of sales order 810, business partner 815 or address 820 (each including a corresponding runtime configured to execute a service).

Figure 8C:
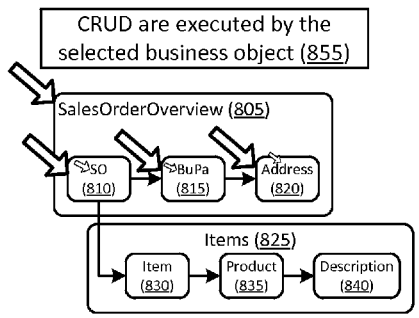

In block 855 CRUD are executed by the selected business object. For example a read operation is executed by the selected business object (e.g., by a processor associated by the business object). For example, as shown in FIG. 8C, one or more of the sales order 810, business partner 815 or address 820 executes the service (e.g., a read) on an associated datastore (e.g., memory, database, organized data, and the like). Although not shown, if the service is associated with an associated node (e.g., items 825), executing the service may include some interaction with an item (e.g., description 840) of the associated node. In other words, in an example implementation, a service call requesting the description of an item in a sales order may result in a call to a service associated with description 840.

Figure 8D:
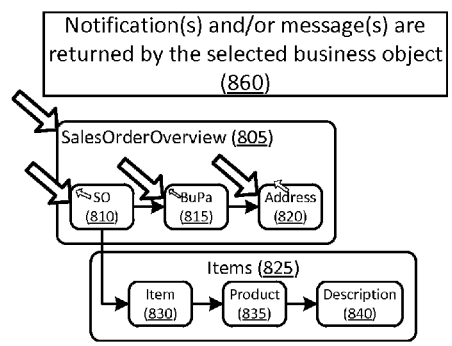

In block 860 a notification(s) and/or message(s) are returned by the selected business objects. For example, the notification and/or message may include information and/or data associated with the triggered service. For example, if the service includes a create service (e.g., create a new sales order, item, business partner, and the like), a notification may include an indication as to whether or not the create service was successful. For example, if the service includes a read service, a message may include data associated with the read service (e.g., the result of a query) and a notification may include information (e.g., a number of rows, date/time, and the like) about the data. As shown in FIG. 8D, one or more of the sales order 810, business partner 815 and address 820 may return the notification and/or message resulting from execution of the service by one or more of the sales order 810, business partner 815 and address 820.

Figure 8E:
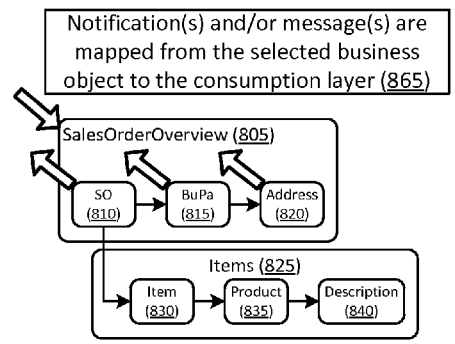
Figure 8F:
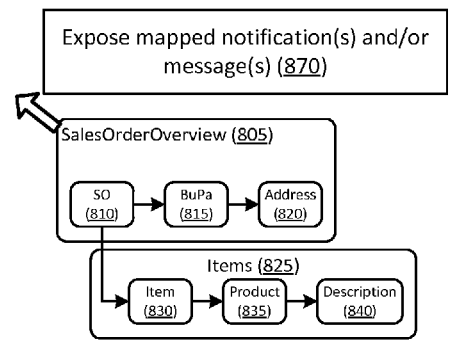

In block 865 the notification(s) and/or message(s) are mapped from the selected business object to the consumption layer. For example, the CRUD module 510 may include metadata that is configured to map notification(s) and/or message(s) that are framework (e.g., the framework associated with the business object) specific to a common or intermediate language or structure (e.g., SADL or XML) for use in the consumption layer. For example, as shown in FIG. 8E, a business partner 815 may be mapped from "BuPa" in the model layer to "My_BuPa" in the consumption layer.

Finally, in block 870 the mapped notification(s) and/or message(s) are exposed. For example, the notification(s) and/or message(s) are made available to the UI so that the processor associated with the UI may take appropriate action. For example, the processor may display results on the UI. The processor may display a window indicating completion, success, failure and/or the like of the triggered service. Examples of business objects, services and/or the like described above with regard to FIGS. 8A-8E are illustrative in nature and do not limit the subject matter of this disclosure in any way.

Figure 9:
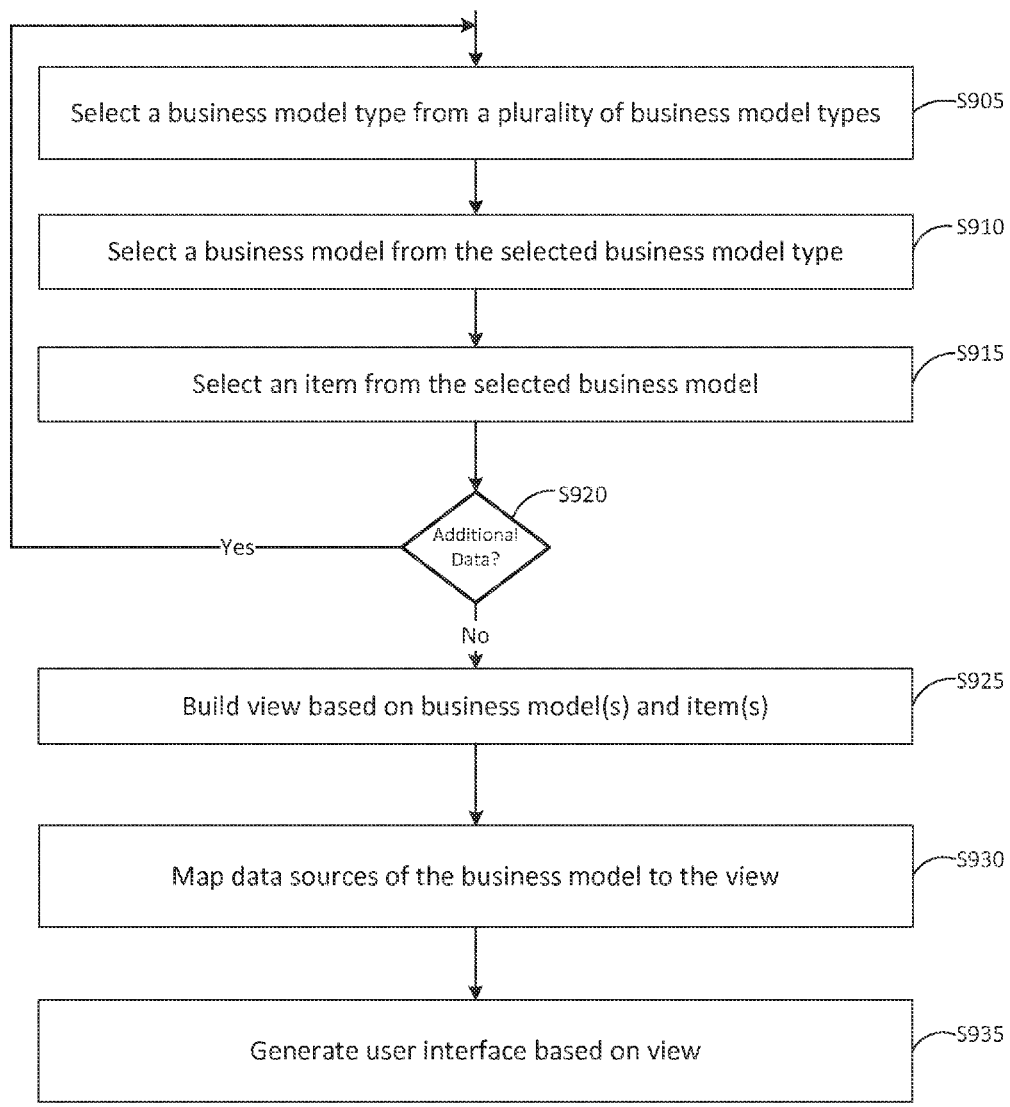
FIG. 9 illustrates another flowchart according to at least one example embodiment.

FIG. 9 illustrates another flowchart according to at least one example embodiment. The steps described with regard to FIG. 9 may be performed due to the execution of software code stored in a memory (e.g., at least one memory 1310) associated with an apparatus (e.g., as shown in FIG. 13) and executed by at least one processor (e.g., at least one processor 1305) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 9.

As shown in FIG. 9, in step S905 a business entity type from a plurality of business model types is selected. For example, a window, panel, drop down, and/or the like (e.g., window 705, 755) may show a list of business model types (e.g., as an expandable list) showing business model types associated with a model layer. The window, panel, drop down, and/or the like may be generated using the steps described above with regard to FIG. 6. In other words, the window, panel, drop down, and/or the like may be generated based on the published business objects (organized as business model types). Each of the business model types may be implemented of a different model layer framework (e.g., BOPF, CDS, and the like). For example, a business partner business object may be implemented on a different framework than a product business object. The developer can access the business model types without knowledge of how to implement the underlying framework for each of the business model types.

In step S910 a business model from the selected business model type is selected. For example, selecting a business model type may expose at least one business model. In other words, if a window includes a list of business model types as an expandable list, the expandable list may be expanded based on the business model type and at least one business model. Selecting a business model types may expose at least one business model which in turn may also be selected.

In step S915 an item from the selected business model is selected. For example, continuing the expandable list example, each expanded business model may expose at least one item which in turn may also be selected. In example embodiments, the item may have an associated data. For example, the item may correspond to or be associated with a column in a database (e.g., relational database).

In step S920 whether or not additional data is desired is determined. If additional data is desired, processing returns to step S905. Otherwise, processing continues to step S925. For example, in an example implementation, data may be acquired from one or more data structures (e.g., database, HANA) associated with a model layer framework(s) (e.g., BOPF, CDS, and the like). One data (e.g., an item of a business object) of interest may be associated with a first business model type associated with a first model layer framework which is selected during a first iteration. In a second or subsequent (e.g., multiple iterations) another data (e.g., another item of a business object) of interest associated with the first (e.g., the same) or a second business model type associated with the first (e.g., the same) or a second model layer framework may be selected. If all of the data of interest is selected, processing continues to map, use, associate, link, and the like the data.

In step S925 a view based on the business model(s) and business model item(s) is built. A view may be configured to allow a display of different perspectives of the same data structure (e.g., database, HANA) or combination of data structures (e.g., databases, HANA). Views may define which business object items (e.g., table column) and stored data (e.g., row) are viewed. The access to the data may be simplified and/or persisted by presenting the structure of the data from at least one database table into a single named view (which can be used like a table) that can hide, not show, not select and/or eliminate unnecessary data while contributing desired data. In an example implementation, each of the selected nodes from the selected business objects may be organized into a view. The view may include a mechanism to limit and/or focus the amount and/or type of data. For example, at least one of the aforementioned business objects may be associated with purchasing an airline flight. Although the business object exposes a multitude of details for the purchase, the view may limit the exposed information to, for example, amount and date, hiding the credit card information and customer preferences.

In step S930 data sources of the business model are mapped to the view. For example, a generated view may be purpose bound, for example, to an intended UI or use case. The associated business entities may be designed keeping reusability in mind, avoiding redundancy and so on. For example, when using a sales order, it will have associations to a buyer, seller and owner, which may all be modelled as business partners. When binding the business partner data to a view, one follows, for example, three different associations from the sales order entity to the same business partner entity. The mapping serves to avoid having the same element, like business partner name, three times in the UI-map it once to seller name, buyer name and owner name, respectively. For example, as discussed above, in a SADL definition, a result set can be defined. The result set can contain a (SADL) structure with the attributes and substructures. In a (SADL) attribute, the name of the attribute and the binding can be specified. Accordingly, as shown in FIGS. 7A and 7B, a developer can map the business model to the view using data source attributes and/or association binding. In an alternative embodiment, steps S925 and/or 930 are performed before step S920. In other words, the decision to add data may be performed after building a view and mapping data sources.

In step S935 a user interface based on view is generated. For example, a user interface may include a number of fields. Each field may be linked, associated, tied to, and the like an item in the aforementioned view. The user interface may include other items as well. For example, the user interface may include data entry fields, drop down lists, pictures, information panels, and/or the like. For example, the user interface may include a field and/or drop down list such that an end user of the user interface can select or limit data associated with the view and therefore the user interface.

At least one example embodiment implements general purpose application programming interface (API) configured to be used in several implementation scenarios. For example, in a Value Help (or F4 help) scenario, a search help tool may combine the benefits of this UI concept with an In-Memory database (e.g., high-performance analytic appliance (HANA)) results. For example, in a HANA fuzzy (or freestyle) search tool an error tolerant search can be achieved such that misspelling of search terms may return relevant results. In other words, an end user of the UI may enter "trevel expence" where both "travel" and "expense" are clearly misspelled. According to example embodiments, results may be returned that include the correct spelling (e.g., "travel expense").

In another example implementation, a graphical user interface (GUI) configured to display a list viewer (e.g., ABAP List Viewer or ALV) may be used to view a list used in, for example, various reports. According to an example embodiment, an integrated data access differs may be used in order to push-down a request associated with the GUI. In this integrated data access (IDA) approach, the ALV directly retrieves the data from the database, by performing a query considering all services (sorting, filtering, paging, etc.). The application and the end user parameterize the query executed by the ALV IDA. Only the displayed data is read from the database. In addition, features like the HANA Fuzzy Search can be integrated into an API configured to execute the IDA approach.

Figure 10A:
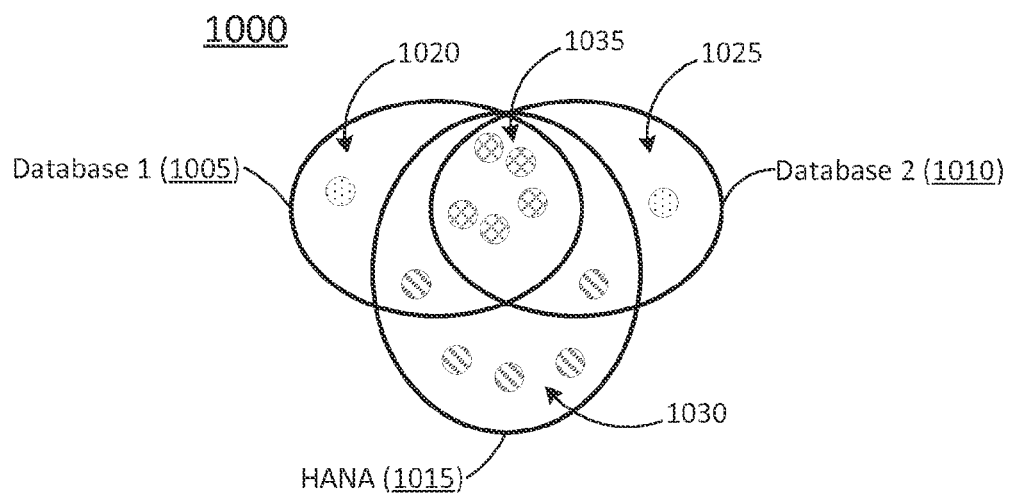
FIGS. 10A and 10B illustrate feature intersections according to at least one example embodiment.
Figure 10B:
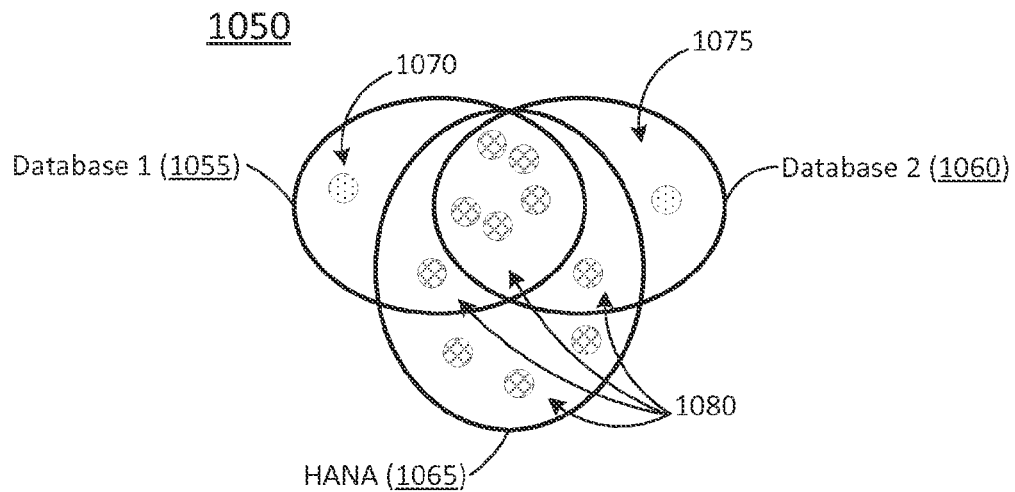

FIGS. 10A and 10B illustrate feature intersections according to at least one example embodiment. According to at least one example embodiment, in order to support a plurality of implementation scenarios associated with a query push-down, a database interface configured to push-down common UI services like sorting, filtering and paging to the database may be developed. Further, the database interface may be configured to enable HANA specific features (e.g., in order to support fuzzy search). The query interface may be referred to as an ABAP Query Interface (ABQI) or SADL Query Engine. The ABQI may also avoid SQL Injections by validating the input from an application and/or end-user interacting with the API. In at least one example implementation, the ABQI shall ensure, that any database query could be performed for any database.

In an example implementation, OpenSQL is a set of ABAP statements that perform operations like reads, modifies or deletes data in any number of database frameworks. OpenSQL is independent of the database system, so the syntax of the open SQL is uniform for all supported databases. OpenSQL statements may be passed to the database interface. The database interface converts the OpenSQL to native SQL (e.g., DB2) and passes the native SQL on to the database. Accordingly, using OpenSQL an application developer can ignore database specific details (e.g., syntax, data types), since OpenSQL in combination with a data dictionary (DDic) may provide an ABAP-embedded abstraction layer. Using this example implementation, common database features can be provided. However, if a particular feature (e.g., paging) is not supported by one of the plurality database management systems, this feature may not be exposed via OpenSQL. As a result HANA specific features may not be supported by OpenSQL.

In the example embodiment shown in FIG. 10A, a first database abstraction 1000 is illustrated as a feature intersection using a database interface based on an open source database language (e.g., OpenSQL or MySQL). In FIG. 10A three database systems 1005, 1010 1015 are shown (although example embodiments are not limited thereto). Database system 1015 is illustrated as a HANA. HANA (e.g., SAP™ HANA) may be a data warehouse appliance for processing high volumes of operational and transactional data in real-time. HANA may use in-memory analytics, an approach that queries data stored in random access memory (RAM) instead of on hard disk or flash storage. HANA may have special capabilities or features not implemented in other (e.g., non In-Memory database) systems.

Using OpenSQL, the capabilities identified as capabilities 1035 may be implemented because the capabilities 1035 can be implemented in each of the three database systems 1005, 1010 1015. However, using OpenSQL capabilities 1020, 1025 and 1030 may not be implemented because the capabilities 1035 cannot be implemented in each of the three database systems 1005, 1010 1015. In an alternative implementation one or more of capabilities 1020 and 1025 may be implemented in OpenSQL if one or more of capabilities 1020 and 1025 are common features or capabilities even though the common feature or capability may not be implemented in all database systems. However, HANA special capabilities or features may not implemented in OpenSQL.

In another example implementation, a feature super-set implements a database interface configured to expose any database capability or feature including those that are not supported by all databases. For example, HANA specific features may be supported in a feature super-set implementation. In order to provide HANA specific features or by offering database specific features in general with such a super-set approach, two problems should be addressed. First, support for different database management systems includes providing an infrastructure configured to register database specific implementations. Second, a capability service (e.g., a consumer of the query interface) may be configured to check if a feature is supported on the current database, therefore the database interface may be configured to expose the supported feature set of the current database management system. In an example implementation, the feature super-set for should be chosen to implement an ABAP Query Interface (ABQI) if a HANA system is included.

In the example embodiment shown in FIG. 10B, a second database abstraction 1050 is illustrated as a feature intersection using a database interface based on ABQI configured to implement a feature super-set. As shown in FIG. 10B three database systems 1055, 1060 and 1065 are shown (although example embodiments are not limited thereto). Database system 1065 is illustrated as a HANA. Using the ABQI, the capabilities identified as capabilities 1080 may be implemented even though the capabilities 1080 may not be implemented in each of the three database systems 1055, 1060 and 1065. One or more of capabilities 1070 and 1075 may be implemented in the ABQI if one or more of capabilities 1070 and 1075 are common features or capabilities even though the common feature or capability may not be implemented in all database systems.

Figure 11:
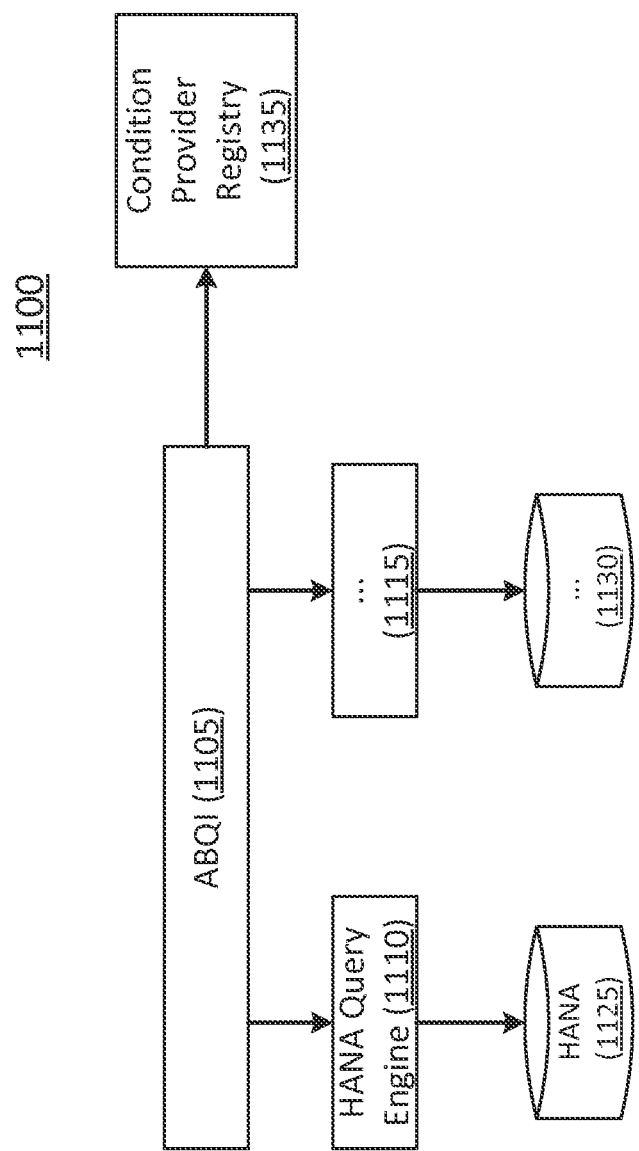
FIGS. 11 and 12 illustrate block diagrams of systems including a query interface according to at least one example embodiment.
Figure 12:
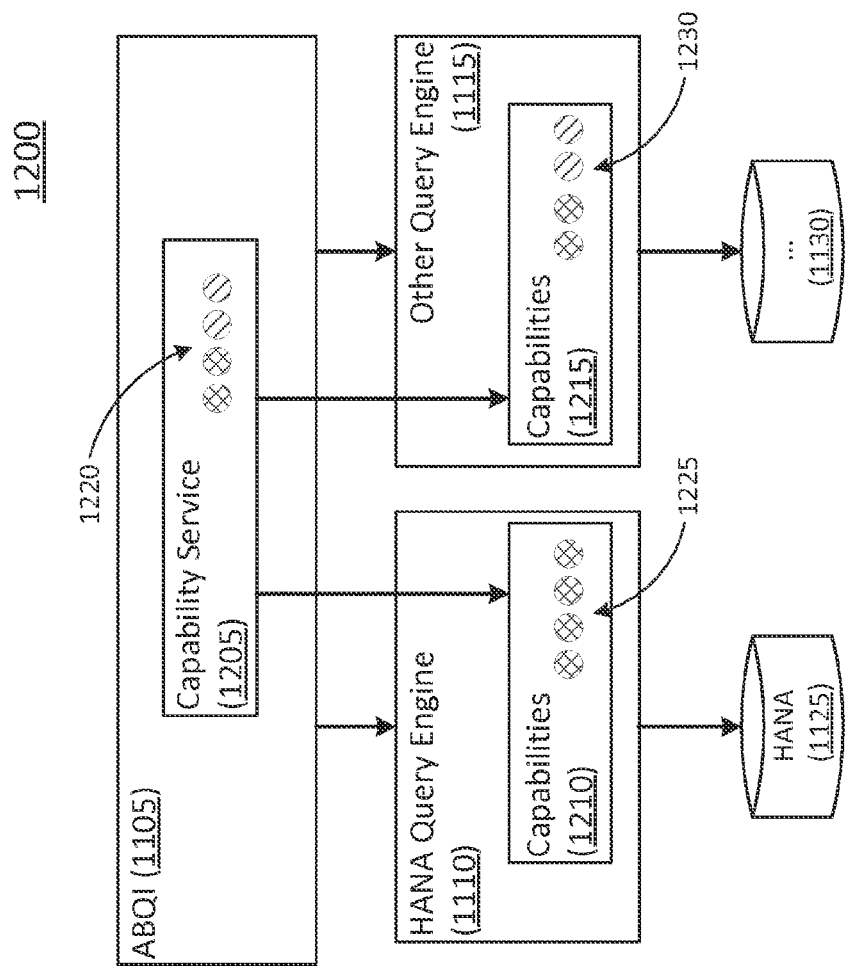

FIGS. 11 and 12 illustrate block diagrams of systems including a query interface according to at least one example embodiment. As shown in FIGS. 11 and 12, the system may include at least one module, engine and/or object. The module, engine and/or object may be implemented due to the execution of software code stored in a memory (e.g., at least one memory 1310) associated with an apparatus (e.g., as shown in FIG. 13) and executed by at least one processor (e.g., at least one processor 1305) associated with the apparatus. However, alternative embodiments are contemplated such as a system embodied as a special purpose processor. Although the module, engine and/or object are described as being executed by a processor, the module, engine and/or object are not necessarily executed by a same processor. In other words, at least one processor may execute the software code configured to implement the module, engine and/or object described in relation to FIGS. 11 and 12.

According to example embodiments, the consumer of ABQI (e.g., Value Help and ALV) pushes down as many capabilities and/or features as possible to the database. Therefore the ABQI consumer interface should be offer multiple features to as many consumers as possible. The provider API can be implemented a plurality of times for each supported database. Therefore, a consumer API may be configured to enable and/or implement core capabilities and/or features (e.g., sorting, paging, and the like), convenience capabilities and/or features (e.g., an authority check), and selection parameters (e.g., those not supported by the DBMS natively). Selection Parameters (also called Range Tabs or Select Options) may be the ABAP-way of defining filters in user interfaces. According to example embodiments, selection parameters may be part of the ABQI consumer interface. ABQI internally maps the selection parameters to a condition enriching the WHERE clause.

The ABQI implementation of the consumer API may be configured to map the convenience capabilities and/or features to the core capabilities and/or features. A provider API may be implemented for each individual database. The core feature set covers the database features: sorting, paging, conditions, text search, aggregation and grouping, and/or the like. For example, in most use cases the displayed data should be retrieved from the database in order to minimize the response time and memory consumption in ABAP. Paging on the database may be possible if an authorization check is also performed on the database.

As shown in FIG. 11, the system 1100 includes an ABQI 1105, a HANA query engine 1110, other query engine 1115, a HANA 1125, other database 1130 and a condition provider registry 1135. The other query engine 1115 and the other database 1130 may be one of a plurality of query engines and databases for which the ABQI 1105 has access (e.g., a communicative link and permission to Create/Read/Update/Delete).

In an example implementation, a registry for different database specific implementations may be implemented based on the separation of the ABQI 1105 (e.g., as a consumer API or interface) and a query engines (e.g., as a provider API or interface). The registry may be configured to map the ABQI 1105 (e.g., as a consumer API) to corresponding capabilities of the database via the query engines (e.g., as a provider API). For example, using a business add in (BAdI) infrastructure specific implementation can be registered for each different database management system (DBMS). As a BAdI fallback implementation an OpenSQL variant of the provider API can be implemented. During runtime ABQI calls the BAdI to get the provider for the DBMS of a current operation.

ABQI 1105 may be configured to determine a query engine (e.g., HANA query engine 1110, query engine 1115, and the like) to call for an associated consumer level query execution. For example, ABQI 1105 may call HANA query engine 1110 if a capability, a query, and the like is associated with a HANA and query engine 1115 if a capability, a query and the like is associated with a DB2 database. For example, ABQI 1105 may include the aforementioned registry. The registry may be configured to maintain a correspondence between a capability (e.g., sorting, paging, and the like) for a DBMS and a query engine routine or API for the capability as implemented in the specific database. In other words, the registry may be used to link or map an API for a specific database implementation of a capability and a consumer request to implement the capability. In this way, a database independent consumer API may support a plurality of different DBMS based on provision of a provider API for DB-specific implementations.

ABQI 1105 may be further configured to separate, disconnect, disassociate, and/or the like elements of a larger operation such that each element is pushed-down to a corresponding query engine for each element. For example, a first element of an operation (e.g., a query) may be associated with a HANA and a second element of an operation may be associated with a DB2 database. The ABQI 1105 may be configured to disassociate the first element and the second element from the larger operation and call the appropriate query engine. The ABQI 1105 may be subsequently configured to rebuild the larger operation from the data returned from the associated query engines.

The condition provider registry 1135 may be configured to provide application or framework specific restrictions for data manipulation. The condition provider registry 1135 may be evaluated by an ABQI and transform the restrictions into an intermediate post fix format and passed to a query engine for use in a where clause of a query.

A capability service may be configured to enable the offering of HANA specific features in combination with the support of different DBMS. For example, on the one hand specific features may be consumed. On the other hand the applications (as a consumer) should run on any DBMS. Accordingly, in an example implementation a service specifying which features are supported by the current DBMS may be implemented. The query engine (e.g., as a provider API) may include a signature for the capability service. Each database implementation can define which features are supported. The configuration is exposed via ABQI 1105 and each consumer has to check during runtime, if a particular feature is enabled or not.

As shown in FIG. 12, the system 1200 includes the ABQI 1105, the HANA query engine 1110, the other query engine 1115, the HANA 1125, and the other database 1130. The ABQI 1105 further includes capability service 1205 configured to expose capabilities 1210 and 1215 associated with the HANA query engine 1110 and the other query engine 1115, respectively. The capability service 1205 may be configured to expose capabilities 1210 and 1215 in a uniform manner such that capabilities 1210 and 1215 are indistinguishable to a consumer even though the capabilities 1210 and 1215 operate on different databases.

FIG. 13 illustrates a block diagram of a system according to at least one example embodiment. As shown in FIG. 13, the system (or apparatus) 1300 includes at least one processor 1305 and at least one memory 1310. The at least one processor 1305 and the at least one memory 1310 are communicatively coupled via bus 1315. The system 1300 may be, for example, an element of a computing device (e.g., a cloud computing device or a server).

In the example of FIG. 13, the system 1300 may be at least one computing device and should be understood to represent virtually any computing device configured to perform the methods described herein. As such, the system 1300 may be understood to include various standard components which may be utilized to implement the techniques described herein, or different or future versions thereof. By way of example, the system 1300 is illustrated as including the at least one processor 1305 (e.g., a silicon based processor), as well as the at least one memory 1310 (e.g., a non-transitory computer readable storage medium) respectively.

Thus, as may be appreciated, the at least one processor 1305 may be utilized to execute instructions stored on the at least one memory 1310, so as to thereby implement the various features and functions described herein, or additional or alternative features and functions. Of course, the at least one processor 1305 and the at least one memory 1310 may be utilized for various other purposes. In particular, it may be appreciated that the at least one memory 1310 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 1310.

As shown in FIG. 13, the at least one memory 1310 includes a business entity module 1320 and a metadata datastore 1325. The business entity module 1320 includes a consumption layer interface module 1330 and a model layer interface module 1335. The consumption layer interface module 1330 includes a CRUD module 1340. The model layer interface module 1335 includes a runtime 1345.

The system 1300 may also include a network interface 1360 communicatively coupled to bus 1315. The network interface 1360 is configured to interface with one or more servers 1370A, 1370B, 1370C, 1370D, 1370E via network 1365. Network 1365 may be any network (e.g., internet or intranet). The servers 1370A, 1370B, 1370C, 1370D, 1370E may be configured to implement at least one framework associated with a model layer (e.g., enterprise search model 415, BOL 420, BOPF 425, CDS 430, DDIC 435, SPI 440, and the like).

The business entity module 1320 may be configured to publish business objects as and/or in association with a business entity. Accordingly, the model layer interface module 1335 may be configured to interface with at least one model layer framework (e.g., enterprise search model 415, BOL 420, BOPF 425, CDS 430, DDIC 435, SPI 440, and the like). And, the consumption layer interface module 1330 may be configured to interface with at least one consumption layer tool (e.g., FPM 405, GW 410, and the like).

The CRUD module 1340 may be configured to delegate calls to a runtime (e.g., runtime 1345). For example, a read may be delegated to the runtime 1345. For example, the CRUD module 1340 may map a triggered service to a corresponding runtime (e.g., a service in a business object). The CRUD then delegates (e.g., calls or forwards) the requested execution of the service to the selected business object.

The runtime 1345 may be configured to call, implement and/or execute the function, code, tool, and/or the like in order to create, read, update and/or delete an element data entry. For example, the runtime 1345 (e.g., BOPF runtime 525) may map a function, code and/or tool associated with a business object including data associated with a database (e.g., database 520).

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A non-transitory computer-readable storage medium having stored thereon computer executable program code which, when executed on a computer system, causes the computer system to perform steps comprising:
   discover a Service Adaptation Definition Language (SADL) definition, the SADL definition representing a plurality of business entity types each associated with a model layer framework and each of the plurality of business entity types including at least one business entity;
   display, on a user interface, a representation of the SADL definition;
   receive an indication of a first selection of a first business entity type of the plurality of business entity types;
   receive an indication of a second selection of a second business entity type of the plurality of business entity types, the second business entity type being associated with a different model layer framework than the first business entity type; and
   define a new user interface using the first and second business entity types, wherein the new user interface works with the model layer framework of the first business entity type and with the different model layer framework of the second business entity type.

2. The non-transitory computer-readable storage medium of claim 1, the steps further comprising:
   receive an indication of a selection of a business entity associated with one of the first business entity type and the second business entity type;
   receive an indication of a selection of business object service associated with the business entity; and
   map the selected business object service to the business entity.

3. The non-transitory computer-readable storage medium of claim 1, the steps further comprising:
   receive an indication of a selection of a business entity associated with one of the first business entity type and the second business entity type;
   receive an indication of a selection of an item associated with the business entity; and
   map the selected item to the business entity.

4. The non-transitory computer-readable storage medium of claim 1, the steps further comprising:
   create a property having a property name;
   choose an ABAP field to link to the property; and
   bind the property to an item selected from a SADL entity.

5. The non-transitory computer-readable storage medium of claim 1, wherein when the user interface is being operated by an end user, the steps further comprise triggering at least one of query, create, read, update and delete operations associated with the business entity.

6. The non-transitory computer-readable storage medium of claim 1, wherein the SADL definition is programming language independent of a model layer framework.

7. A system comprising:
   a first non-transitory computer-readable storage medium having stored thereon computer executable program code which, when executed on a computer system, causes the computer system to perform steps including,
      generate a Service Adaptation Definition Language (SADL) definition for each of a plurality of business entity types, the SADL definition being based on an intermediate representation of each of the plurality of business entities, and
      publish the SADL definition as service of a SADL engine, and
   a second non-transitory computer-readable storage medium having stored thereon computer executable program code which, when executed on a computer system, causes the computer system to perform steps comprising:

discover the SADL definition, and display, on a user interface, a representation of the SADL definition, the user interface configured to enable selection of two or more business entity types each associated with a different model layer framework, the user interface also configured to enable definition of a new user interface using the first and second business entity types, wherein the new user interface works with the different model layer frameworks of the two or more business entity types.

8. The system of claim 7, wherein the SADL definition is programming language independent of a model layer framework.

9. The system of claim 7, wherein
the SADL engine includes a CRUD module configured to delegate calls associated with the at least one of create, read, update and delete operations to a runtime associated with a corresponding business entity type.

10. The system of claim 7, wherein
the SADL engine includes a query module configured to delegate a query to an Advanced Business Application Programming (ABAP) Query Interface.

11. The system of claim 7, wherein generating a SADL definition includes generating a SADL definition for each item of each of the plurality of business entities, the SADL definition including a data source a binding and a name.

12. The system of claim 7, the steps associated with the second non-transitory computer-readable storage medium further include,
receiving an indication of a selection of a business entity;
receiving an indication of a selection of business entity property associated with the business entity, the business entity property being one of a service and an item; and
mapping the selected business entity property to the business entity.

13. A non-transitory computer-readable storage medium having stored thereon computer executable program code which, when executed on a computer system, causes the computer system to perform steps comprising:
generate a Service Adaptation Definition Language (SADL) definition for each of a plurality business entities associated with different model layer frameworks, the SADL definition being based on an intermediate representation of each of the plurality of business entities; and publish the SADL definition as a service of a SADL engine configured to delegate at least one of query, create, read, update and delete operations associated with the business entities, wherein the SADL engine interacts with a user interface defined using at least two of the plurality of business entities, the new user interface working with the different model layer frameworks of the at least two of the plurality of business entities.

14. The non-transitory computer-readable storage medium of claim 13, wherein
the SADL engine includes a CRUD module configured to delegate calls associated with the at least one of create, read, update and delete operations to a runtime associated with a corresponding business entity type.

15. The non-transitory computer-readable storage medium of claim 13, wherein
the SADL engine includes a query module configured to delegate a query to an Advanced Business Application Programming (ABAP) Query Interface.

16. The non-transitory computer-readable storage medium of claim 13, wherein
the SADL engine includes a CRUD module configured to receive an indication that a CRUD service has been triggered, and
return at least one of a notification and a message based on an execution of the triggered service.

17. The non-transitory computer-readable storage medium of claim 13, wherein generating a SADL definition includes generating a SADL definition for each item of each of the plurality of business entities, the SADL definition including a data source a binding and a name.

18. The non-transitory computer-readable storage medium of claim 13, wherein translating the business entity into an intermediate representation includes converting each of the data entities into metadata including a mapping of relationships between business entities.

19. The non-transitory computer-readable storage medium of claim 13, wherein translating the business entity into an intermediate representation includes translating a procedure into a string of symbols having a common language.

20. The non-transitory computer-readable storage medium of claim 13, wherein the SADL definition is programming language independent of a model layer framework.

* * * * *